(12) United States Patent
Kim et al.

(10) Patent No.: US 10,399,480 B2
(45) Date of Patent: Sep. 3, 2019

(54) CONTROL DEVICE MOUNTED ON VEHICLE AND METHOD FOR CONTROLLING THE SAME

(71) Applicant: LG ELECTRONICS INC., Seoul (KR)

(72) Inventors: Cheolmun Kim, Seoul (KR); Wonseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 15/596,851

(22) Filed: May 16, 2017

(65) Prior Publication Data

US 2017/0327030 A1 Nov. 16, 2017

(30) Foreign Application Priority Data

May 16, 2016 (KR) .................. 10-2016-0059745

(51) Int. Cl.
*B60Q 1/10* (2006.01)
*B60Q 1/115* (2006.01)
(Continued)

(52) U.S. Cl.
CPC .............. *B60Q 1/10* (2013.01); *B60Q 1/085* (2013.01); *B60Q 1/115* (2013.01); *B60Q 1/12* (2013.01);
(Continued)

(58) Field of Classification Search
CPC .... B60Q 1/10; B60Q 1/115; B60Q 2300/132; B60Q 2300/14; B60Q 2300/324; B60Q 1/1438; B60Q 1/085
See application file for complete search history.

(56) References Cited

U.S. PATENT DOCUMENTS

| 4,204,270 A * | 5/1980 | Poirier d'Ange d'Orsay ............. B60Q 1/10 362/249.1 |
| 5,193,894 A * | 3/1993 | Lietar ...................... B60Q 1/10 362/276 |

(Continued)

FOREIGN PATENT DOCUMENTS

| CN | 105492253 | 4/2016 |
| DE | 102004052434 A1 * | 5/2006 ............... B60Q 1/10 |

(Continued)

OTHER PUBLICATIONS

JPO machine translation of JP 2000-062524 (original JP document published Feb. 29, 2000) (Year: 2000).*

(Continued)

*Primary Examiner* — Behrang Badii
*Assistant Examiner* — David A Testardi
(74) *Attorney, Agent, or Firm* — Fish & Richardson P.C.

(57) ABSTRACT

A control device may include a sensing unit configured to sense a topographical state of a road surface on which a vehicle is travelling. The control device may also include at least one processor configured to, based on the topographical state of the road surface being a first topographical state, control a head lamp of the vehicle to be in a first output state that outputs light to a first area ahead of the vehicle. The at least one processor may also be configured to, based on the topographical state of the road surface changing to a second topographical state different from the first topographical state, control the head lamp of the vehicle to change to a second output state that maintains the output of the light to the first area ahead of the vehicle.

18 Claims, 18 Drawing Sheets

(51) Int. Cl.
*B60Q 1/24* (2006.01)
*B60Q 1/08* (2006.01)
*B60Q 1/12* (2006.01)
*G06K 9/00* (2006.01)

(52) U.S. Cl.
CPC .......... *B60Q 1/24* (2013.01); *B60Q 2300/112* (2013.01); *B60Q 2300/114* (2013.01); *B60Q 2300/122* (2013.01); *B60Q 2300/124* (2013.01); *B60Q 2300/13* (2013.01); *B60Q 2300/132* (2013.01); *B60Q 2300/142* (2013.01); *B60Q 2300/32* (2013.01); *B60Q 2300/324* (2013.01); *B60Q 2300/45* (2013.01); *G06K 9/00791* (2013.01)

(56) References Cited

U.S. PATENT DOCUMENTS

| | | | | |
|---|---|---|---|---|
| 5,562,336 | A * | 10/1996 | Gotou | B60Q 1/085 362/276 |
| 5,787,370 | A * | 7/1998 | Kutscher | B60G 17/0195 307/10.8 |
| 5,798,911 | A * | 8/1998 | Josic | B60Q 1/085 362/286 |
| 5,877,680 | A * | 3/1999 | Okuchi | B60Q 1/115 315/82 |
| 6,193,398 | B1 * | 2/2001 | Okuchi | B60Q 1/115 362/276 |
| 6,357,898 | B1 | 3/2002 | Toda et al. | |
| 6,373,378 | B1 * | 4/2002 | Ewerhart | B60Q 1/085 340/425.5 |
| 2001/0012206 | A1 | 8/2001 | Hayami | B60Q 1/085 362/464 |
| 2002/0036901 | A1 * | 3/2002 | Horii | B60Q 1/12 362/37 |
| 2003/0067762 | A1 * | 4/2003 | Fukawa | B60Q 1/12 362/37 |
| 2004/0114379 | A1 * | 6/2004 | Miller | B60Q 1/085 362/464 |
| 2004/0125608 | A1 * | 7/2004 | Izawa | B60Q 1/10 362/464 |
| 2007/0025112 | A1 * | 2/2007 | Kuhl | B60Q 1/10 362/466 |
| 2008/0084286 | A1 * | 4/2008 | Teramura | B60Q 1/085 340/438 |
| 2009/0185718 | A1 * | 7/2009 | Moritz | B60Q 1/085 382/104 |
| 2010/0014302 | A1 * | 1/2010 | Okumura | B60Q 1/10 362/466 |
| 2010/0309674 | A1 | 12/2010 | Su et al. | |
| 2012/0134164 | A1 * | 5/2012 | Park | B60Q 1/143 362/464 |
| 2012/0203427 | A1 * | 8/2012 | Ehlgen | B60Q 1/085 701/36 |
| 2012/0314434 | A1 * | 12/2012 | Park | B60Q 1/143 362/465 |
| 2013/0058116 | A1 * | 3/2013 | Galbas | B60Q 1/085 362/512 |
| 2014/0129081 | A1 * | 5/2014 | Ehlgen | B60Q 1/10 701/36 |
| 2014/0301094 | A1 * | 10/2014 | Ehlgen | B60Q 1/115 362/466 |
| 2015/0003086 | A1 * | 1/2015 | Yamasaki | B60Q 1/085 362/466 |
| 2015/0073654 | A1 * | 3/2015 | Foltin | B60Q 1/115 701/36 |
| 2015/0149045 | A1 * | 5/2015 | Mizuno | B60Q 1/1423 701/49 |
| 2015/0175055 | A1 | 6/2015 | Falb | |
| 2015/0239391 | A1 | 8/2015 | Foltin | |

FOREIGN PATENT DOCUMENTS

| | | | | |
|---|---|---|---|---|
| DE | 10-2103-0201850 | | 8/2014 | |
| EP | 652134 | A1 * | 5/1995 | ............ B60Q 1/10 |
| EP | 0869031 | | 10/1998 | |
| EP | 869031 | A2 * | 10/1998 | |
| EP | 1964717 | | 9/2008 | |
| EP | 2119592 | A1 * | 11/2009 | ............ B60Q 1/085 |
| EP | 2418121 | A2 * | 2/2012 | |
| JP | 07277068 | A * | 10/1995 | |
| JP | 2000062524 | A * | 2/2000 | |
| JP | 2000062525 | | 2/2000 | |
| KR | 1020100018366 | A * | 2/2010 | |
| KR | 10-2013-0104721 | | 9/2013 | |
| WO | WO-9618524 | A1 * | 6/1996 | ............ B60Q 1/115 |

OTHER PUBLICATIONS

'www.valeoservice.com' "Lighting Systems: From light to advanced vision technologies," Valeoscope Technical Handbook 2015, 100 pages, (2015).

Extended European Search Report in European Application No. 17169849.1, dated Oct. 18, 2017, 7 pages (with English translation).

* cited by examiner (a)

(b)

(a)

(b)

(a)

(b)

(a)

(b)

(a)

BRAKING DISTANCE Q1

(b)

BRAKING DISTANCE Q2

(a)

(b)

CONTROL DEVICE MOUNTED ON VEHICLE AND METHOD FOR CONTROLLING THE SAME

CROSS-REFERENCE TO RELATED APPLICATION

Pursuant to 35 U.S.C. § 119(a), this application claims the benefit of an earlier filing date and the right of priority to Korean Application No. 10-2016-0059745, filed on May 16, 2016, the contents of which are incorporated by reference herein in its entirety.

TECHNICAL FIELD

The present disclosure relates to a control device mounted on a vehicle and a method for controlling the same.

BACKGROUND

A vehicle is an apparatus configured to transport a user in the user-desired direction. A representative example of a vehicle is a car.

A vehicle is typically provided with various types of lamps. In general, a vehicle includes various vehicle lamps having a lighting function that facilitates illumination of articles or objects near the vehicle to be recognized during driving at night, and that provides a signaling function to indicate a driving state of the vehicle to other vehicles or pedestrians.

Some vehicles include devices operating in a manner of directly emitting light using lamps, such as a head lamp emitting light to a front side to facilitate a driver's view, a brake lamp that illuminates based on a brake operation of the vehicle, or turn indicator lamps that indicate a left turn or a right turn.

As another example, some vehicles include reflectors for reflecting light to facilitate the vehicle to be recognized from outside, which are typically mounted on front and rear sides of the vehicle.

SUMMARY

Implementations described herein provide a control device, which may be mounted on a vehicle, configured to adaptively control one or more lamps provided on the vehicle based on a topographical state of a road or based on a driving state of the vehicle.

In one aspect, a control device may include a sensing unit configured to sense a topographical state of a road surface on which a vehicle is travelling; and at least one processor. The at least one processor may be configured to: based on the topographical state of the road surface being a first topographical state, control a head lamp of the vehicle to be in a first output state that outputs light to a first area ahead of the vehicle; and based on the topographical state of the road surface changing to a second topographical state different from the first topographical state, control the head lamp of the vehicle to change to a second output state that maintains the output of the light to the first area ahead of the vehicle.

In some implementations, the at least one processor may be configured to detect, through the sensing unit, a location ahead of the vehicle where the topographical state of the road surface changes to the second topographical state. The at least one processor may also be configured to, based on the detected location and a driving speed of the vehicle, determine a time at which to control the head lamp to change to the second output state.

In some implementations, the at least one processor may be configured to control the head lamp of the vehicle to change to the second output state that maintains the output of the light to the first area ahead of the vehicle by controlling a light output direction of the head lamp to a direction that maintains the output of the light on the first area ahead of the vehicle based on the topographical state of the road surface changing to the second topographical state.

In some implementations, the head lamp may include a left lamp and a right lamp. The at least one processor may be configured to control the head lamp of the vehicle to change to the second output state that maintains the output of the light to the first area ahead of the vehicle by controlling the left lamp and the right lamp differently based on the topographical state of the road surface changing to the second topographical state.

In some implementations, controlling the left lamp and the right lamp differently based on the topographical state of the road surface changing to the second topographical state may include controlling both the left lamp and the right lamp to change output states based on both a left body of the vehicle and a right body of the vehicle being raised by at least a threshold height corresponding to the topographical state of the road surface changing to the second topographical state, and controlling one of the left lamp or the right lamp to change an output state based on one of the left body or the right body of the vehicle being raised by at least the threshold height corresponding to the topographical state of the road surface changing to the second topographical state.

In some implementations, the at least one processor may be further configured to detect, through the sensing unit, a driving state of the vehicle; and control the head lamp of the vehicle to maintain the output of the light to the first area ahead of the vehicle further based on a change in the driving state of the vehicle.

In some implementations, the change in the driving state of the vehicle may correspond to a body of the vehicle being tilted.

In some implementations, the change in the driving state of the vehicle may correspond to at least one of an acceleration of the vehicle exceeding a threshold acceleration or a braking force of the vehicle exceeding a threshold braking force.

In some implementations, the at least one processor may be configured to calculate a braking distance based on the driving state of the vehicle and based on the topographical state of the road surface; and determine a light output direction of the head lamp based on the calculated braking distance.

In some implementations, the change in the driving state of the vehicle may correspond to the calculated braking distance exceeding a threshold braking distance. The at least one processor may be configured to control the head lamp of the vehicle to maintain the output of the light to the first area ahead of the vehicle by changing a light output direction of the head lamp in an upward direction based on the calculated braking distance exceeding a threshold braking distance.

In some implementations, the change in the driving state of the vehicle may correspond to the vehicle approaching a zone in which an area of the light that is output from the head lamp on the road surface is changed by more than a threshold value. The at least one processor may be further configured to control the head lamp of the vehicle to maintain the output of the light to the first area ahead of the vehicle by changing a light output direction of the head lamp prior to the vehicle reaching a predetermined distance from a start point of the zone, based on a change in the area of the light that is output from the head lamp on the road surface.

In some implementations, changing the light output direction of the head lamp prior to the vehicle reaching the predetermined distance from the start point of the zone, based on a change in the area of the light that is output from the head lamp on the road surface, may include changing the light output direction in an upward direction based on the area of the light that is output from the head lamp on the road surface being reduced by more than a first threshold value; and changing the light output direction in a downward direction based on the area of the light that is output from the head lamp on the road surface being increased by more than a second threshold value.

In some implementations, changing a light output direction of the head lamp prior to the vehicle reaching a predetermined distance from a start point of the zone, based on a change in the area of the light that is output from the head lamp on the road surface, may include, based on a degree of change of the area of the light that is output from the head lamp on the road surface, determining a degree of change of the light output direction of the head lamp.

In some implementations, the at least one processor may be further configured to detect, through the sensing unit, a surrounding area that is outside of a lane in which the vehicle is travelling; and, based on the surrounding area satisfying a first condition, control the head lamp to prevent the output of the light from reaching the surrounding area.

In some implementations, the at least one processor may be configured to, based on an object being detected in the surrounding area through the sensing unit, control the head lamp to direct at least part of the light that is output from the head lamp to the detected object in the surrounding area.

In some implementations, the at least one processor may be configured to control the head lamp to confine the light that is output from the head lamp to a first lane in which the vehicle is travelling; and, based on detecting that the vehicle is changing from the first lane to a second lane adjacent to the first lane, control the head lamp to output the light to extend to a far boundary of the second lane.

In some implementations, the at least one processor may be configured to control the head lamp to output the light to extend to the far boundary of the second lane by, based on detecting that the vehicle is changing from the first lane to the second lane adjacent, determining a speed at which to change a light output direction of the head lamp from the first lane towards the second lane; and changing the light output direction of the head lamp from the first lane to the second lane at the determined speed.

In another aspect, a vehicle may include a control device according to one or more implementations described above.

In another aspect, a method for controlling a vehicle may include detecting a topographical state of a road surface on which a vehicle is travelling. The method may also include, based on the topographical state of the road surface being a first topographical state, controlling a head lamp of the vehicle to be in a first output state that emits light to a first area ahead of the vehicle; and based on the topographical state of the road surface changing to a second topographical state different from the first topographical state, controlling the head lamp of the vehicle to change to a second output state that maintains the output of the light to the first area ahead of the vehicle.

In some implementations, controlling the head lamp of the vehicle to maintain the output of the light to the first area ahead of the vehicle is performed further based on a change in a driving state of the vehicle.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

Further scope of applicability of the present disclosure will become more apparent from the detailed description given hereinafter. However, it should be understood that the detailed description and specific examples are given by way of illustration only, and that various changes and modifications within the spirit and scope of the disclosure may be made.

DETAILED DESCRIPTION

Figure 1:
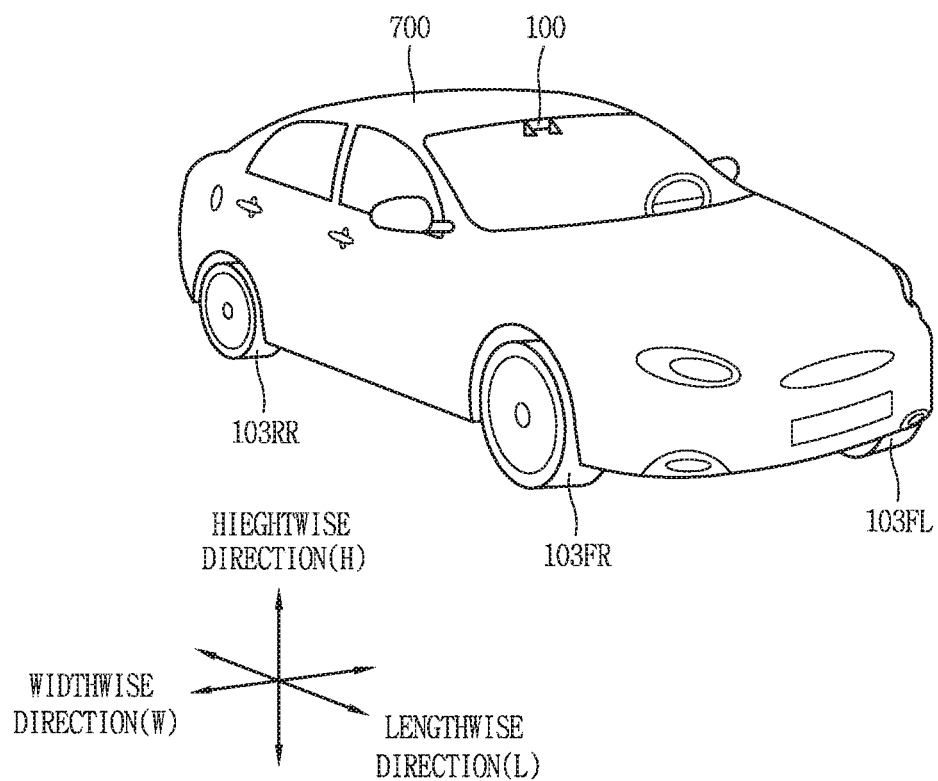
FIG. 1 is a diagram illustrating an example of a vehicle in accordance with some implementations.

In some implementations, a vehicle may include an advanced driving assist system (ADAS) that improves a user's convenience and safety while driving a vehicle. The ADAS may include technology that improves safety during driving a vehicle by intelligently controlling lamps of the vehicle.

Implementations are described herein that enable a control device, which may be mounted on a vehicle, configured to adaptively control one or more lamps of the vehicle to emit light based on at least one of a state of a road surface on which the vehicle is travelling or based on a driving state of the vehicle. Such a control device may help maintain a consistent output of light in a desired area in front of the vehicle, despite changes in the road surface and/or changes in the driving state of the vehicle.

Such a control device, in some implementations, may be configured to control emitting light in a manner to reduce a user's fatigue despite changes in at least one of a state of a road surface on which the vehicle is traveling or changes in a driving state of the vehicle.

In some implementations, the control device mounted on the vehicle may help ensure a front viewing field in an improved manner based on at least one of a state of a road surface on which the vehicle is travelling and or based on a driving state of the vehicle.

In some scenarios, such a control device may yield one or more of the following effects.

First, even though a state of a currently-driving road surface is changed, light may consistently be output to a specific reference area, relative to the position of the vehicle, which may help reduce a user's fatigue.

Second, even though a driving state of a vehicle is changed, light may consistently be output to a specific reference area, thereby reducing undesired changes to the area to which light is emitted from a head lamp, and thereby reducing accident incidence rates.

Third, implementations described herein may provide a control device, configured to control a light output direction to help prevent an accident despite changes in a state of a currently-driving road surface or changes in a driving state of a vehicle.

A vehicle according to some implementations may include any suitable motorized vehicle, such as cars, motorcycles, and the like. Hereinafter, the vehicle will be described based on a car, although implementations are not limited thereto.

The vehicle according to some implementations may be powered by any suitable power source, and may include, for example, an internal combustion engine car having an engine as a power source, a hybrid vehicle having an engine and an electric motor as power sources, an electric vehicle having an electric motor as a power source, and the like.

In some implementations, the vehicle according to some implementations may be an autonomous vehicle that automatically performs operations to facilitate driving of the vehicle.

In the description below, a left side of a vehicle refers to a left side in a driving direction of the vehicle, and a right side of the vehicle refers to a right side in the driving direction. A front side refers to a forward driving direction, and a rear side refers to a backward driving direction.

FIG. 1 is a view illustrating an example of an appearance of a vehicle in accordance with some implementations.

As illustrated in FIG. 1, a vehicle 700 may include wheels 103FR, 103FL, 103RL, . . . , which turn by a power source, and a steering apparatus for adjusting a driving (ongoing) direction of the vehicle 700.

The steering apparatus may include a steering wheel. A user may decide a driving direction of the vehicle 700 using the steering wheel.

A steering input received through the steering apparatus may be transferred to the steering wheel.

The steering apparatus and the steering wheel may be connected to each other electrically or mechanically.

The steering wheels may preferably be the front wheels 103FL and 103FR, but alternatively all of the front wheels 103FL and 103FR and the rear wheels 103RR may operate as the steering wheels.

Figure 2A:
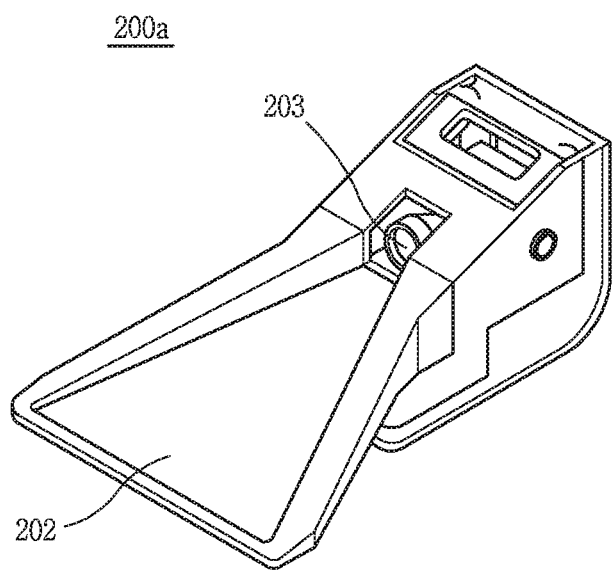
FIGS. 2A to 2C are diagrams illustrating various examples of a camera module included in a control device according to some implementations.
Figure 2B:
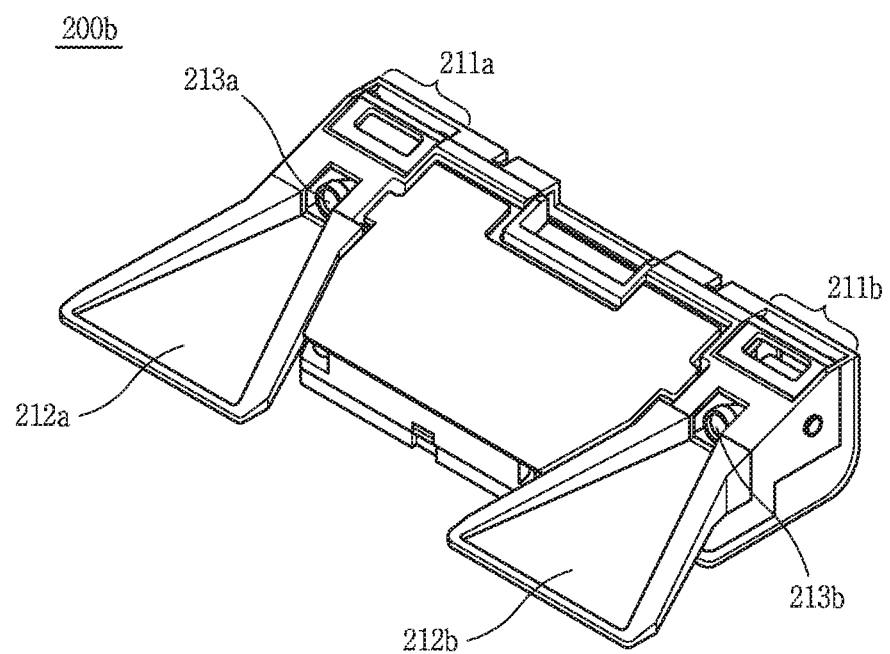
Figure 2C:
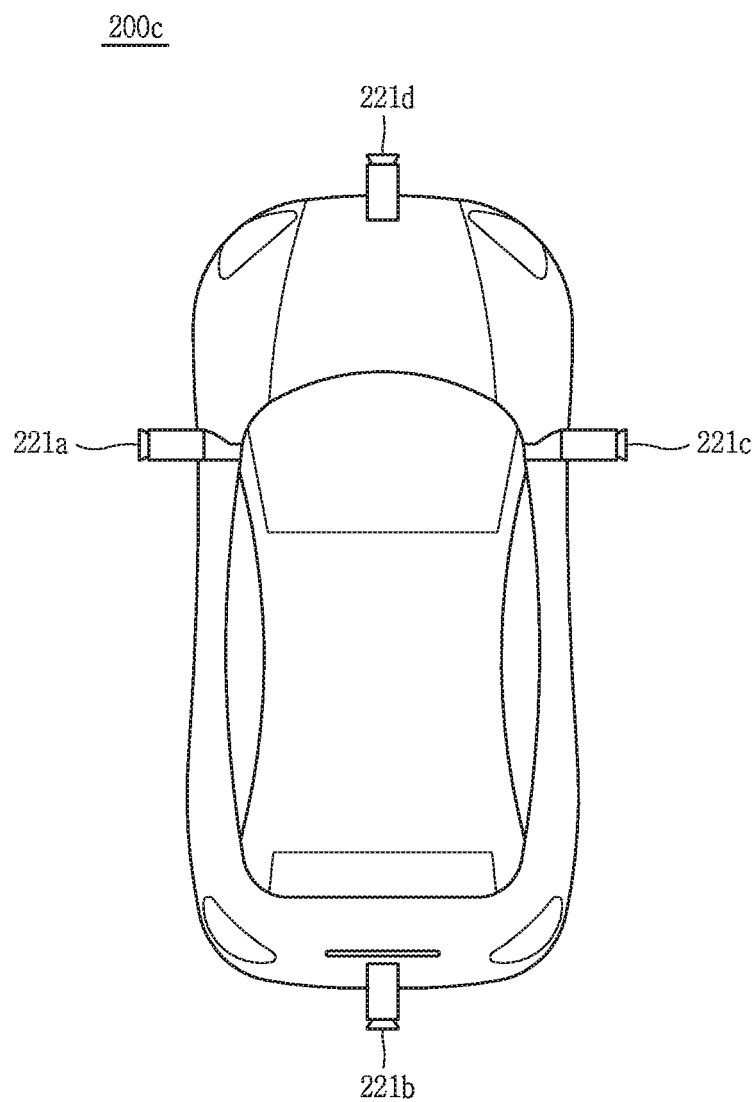

FIGS. 2A to 2C illustrates various examples of a camera module included in a control device according to some implementations.

As illustrated in FIG. 2A, a camera unit 200a may include an image sensor (e.g., CCD or CMOS), a lens 203, and a light shield 202 for shielding a part of light incident on the lens 203.

The camera unit 200a may have a structure which is attachable on or detachable from an inner ceiling or a wind shield of the vehicle 700.

The camera unit 200a may acquire surrounding images of the vehicle 700. For example, the camera unit 200a may acquire front or rear images of the vehicle 700. The images acquired through the camera unit 200a may be transmitted to an image processor.

The image acquired through the camera unit 200a may be referred to as a mono image. Also, the camera unit 200a described with reference to FIG. 2A may be referred to as a mono camera unit or a single camera unit.

Referring to FIG. 2B, a camera unit 200b may include a first camera 211a and a second camera 211b. The first camera 211a may include a first image sensor (e.g., CCD or CMOS) and a first lens 213a. The second camera 211b may include a second image sensor (e.g., CCD or CMOS) and a second lens 213b.

In some implementations, the camera unit 200b may include a first light shield 212a and a second light shield 212b for partially shielding light incident on the first lens 213a and the second lens 213b.

In some implementations, the camera unit 200b may have a structure which is attachable on or detachable from an inner ceiling or a wind shield of the vehicle 700.

The camera unit 200b may acquire surrounding images of the vehicle 700. For example, the camera unit 200b may acquire front or rear images of the vehicle 700. The images acquired through the camera unit 200b may be transmitted to an image processor.

In some implementations, the images acquired through the first camera 211a and the second camera 211b may be referred to as stereo images.

The camera unit 200b described with reference to FIG. 2B may be referred to as a stereo camera unit.

Referring to FIG. 2C, a camera unit 200c may include a plurality of cameras 221a, 221b 221c and 221d.

For example, in some implementations, the left camera 221a may be disposed within a case surrounding a left side mirror. The right camera 221c may be disposed within a case surrounding a right side mirror. The front camera 221d may be disposed on one area of a front bumper, and the rear camera 221b may be disposed on one area of a trunk lid.

The plurality of cameras 221a, 221b, 221c and 221d may be disposed on the left side, the rear side, the right side and the front side of the vehicle, respectively. Each of the plurality of cameras 221a, 221b, 221c and 221d may include an image sensor (e.g., CCD or CMOS) and a lens.

The camera unit 200c may acquire surrounding images of the vehicle. For example, the camera unit 200c may acquire front, rear, left and right images of the vehicle. The images acquired through the camera unit 200c may be transmitted to an image processor.

In some implementations, the images acquired through the plurality of cameras 221a, 221b, 221c and 221d of FIG. 2C or a merged image of the acquired images may be referred to as an around view image. Also, the camera unit 200c described with reference to FIG. 2C may be referred to as an around view camera unit.

Figure 3:
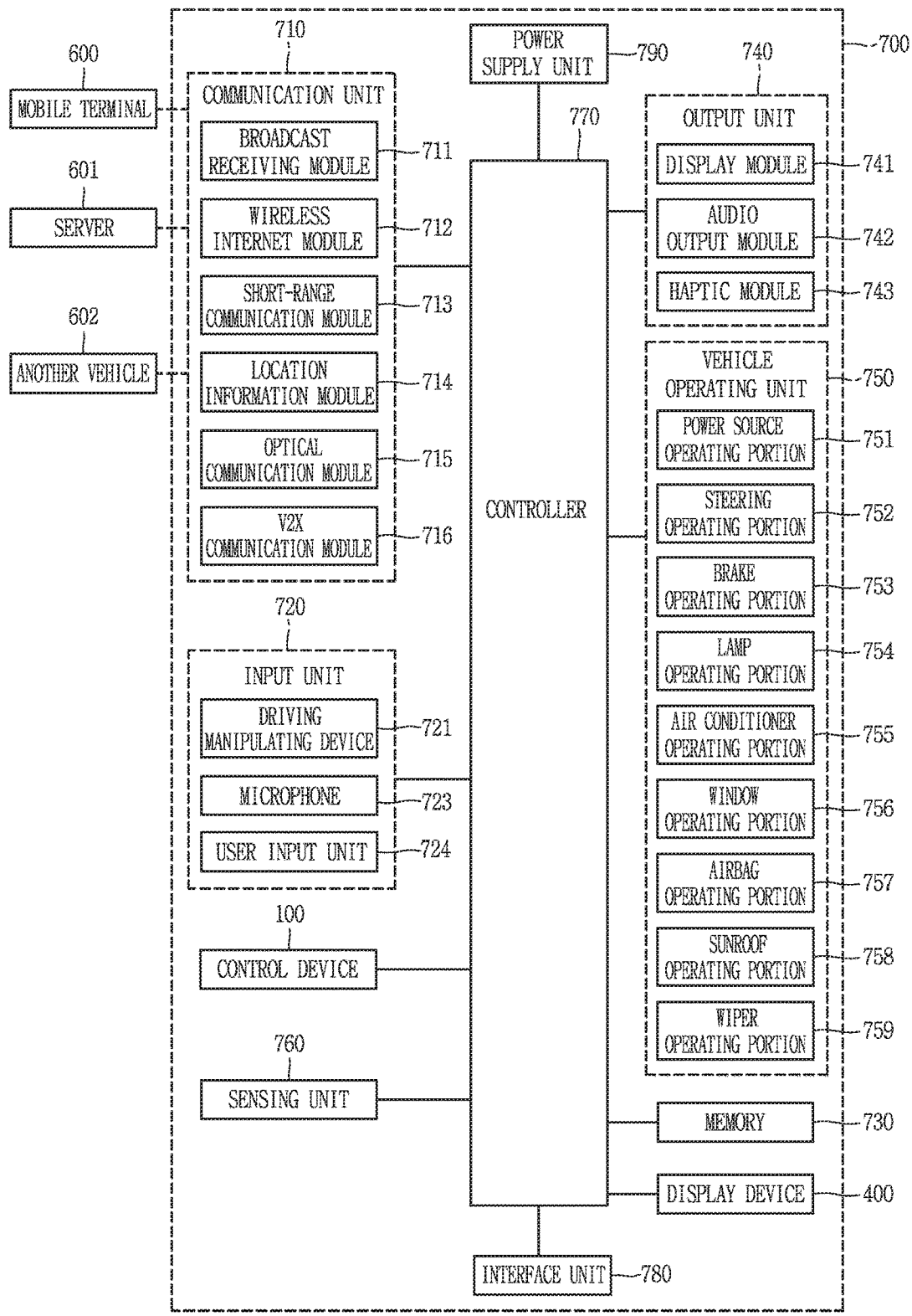
FIG. 3 is a block diagram illustrating an example of a vehicle in accordance with some implementations.

FIG. 3 is a block diagram illustrating a vehicle 700 in accordance with some implementations.

As illustrated in FIG. 3, the vehicle 700 may include a communication unit 710, an input unit 720, a sensing unit 760, an output unit 740, a vehicle operating unit 750, a memory 730, an interface unit 780, a controller 770, a power supply unit 790, a control device 100, a driver status monitoring (DSM) system, and a vehicle display device 400.

The communicating unit 710 may include at least one module allowing wireless communications between the vehicle 700 and a mobile terminal 600, between the vehicle 700 and an external server 601 or between the vehicle 700 and another vehicle 602. Also, the communication unit 710 may include at least one module connecting the vehicle 700 to at least one network.

The communication unit 710 may include a broadcast receiving module 711, a wireless Internet module 712, a short-range communication module 713, a location information module 714, an optical communication module 715, and a V2X communication module 716.

The communication unit 710 may receive weather information. The communication unit 710 may receive the weather information from the outside through the broadcast receiving module 711, the wireless Internet module 712 or the V2X communication module 716.

The communication unit 710 may receive (driving) road information. The communication unit 710 may recognize a location of the vehicle 700 through the location information module 714, and receive road information corresponding to the location of the vehicle 700 through the wireless Internet module 712 or the V2X communication module 716.

The communication unit 710 may receive traffic light change information from the external server 601 through the V2X communication module 716. Here, the external server 601 may be a server which is located at a traffic control station which controls traffic conditions.

The broadcast receiving module 711 receives a broadcast signal and/or broadcast associated information from an external broadcast managing entity via a broadcast channel. Here, broadcasting includes radio broadcasting or TV broadcasting.

The wireless Internet module 712 refers to a module that is configured to facilitate wireless Internet access and may be mounted within the vehicle 700 or detachably coupled to the vehicle 700. The wireless Internet module 712 transmits and/or receives wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink PacketAccess (HSDPA), High Speed Uplink PacketAccess (HSUPA), Long Term Evolution (LTE), LTE-advanced (LTE-A) and the like. The wireless Internet module 712 transmits/receives data according to one or more of such wireless Internet technologies, and other Internet technologies as well. The wireless Internet module 712 receives weather information, road traffic condition information (e.g., transport protocol expert group (TPEG)) from the external server 601.

The short-range communication module 713 facilitates short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 may engage with or establish short-range wireless area networks to support short-range communications between the vehicle 700 and at least one external device. For example, the short-range communication module 713 may exchange data with the mobile terminal 600 in a wireless manner. The short-range communication module 713 may receive various types of information, such as weather information, road traffic condition information (e.g., transport protocol expert group (TPEG) from the mobile terminal 600. In some implementations, when the user enters the vehicle 700, the user's mobile terminal 600 and the vehicle 700 may be paired with each other automatically or by an application executed by the user.

The location information module 714 is a module for acquiring the location of the vehicle 700, and representatively includes a global positioning system (GPS) module. For example, if the vehicle uses the GPS module, the location of the vehicle may be acquired using signals sent from a GPS satellite.

The optical communication module 715 may include a light transmitting portion and a light receiving portion.

The light receiving portion may receive information by converting a light signal into an electric signal. The light receiving portion may include a photo diode (PD) for receiving light. The photo diode may convert light into an electric signal. For example, the light receiving portion may receive information related to a front vehicle based on light emitted from a light source included in the front vehicle.

The light transmitting portion may include at least one light emitting element for converting an electric signal into a light signal. Here, the light emitting element is preferably a light emitting diode (LED). The light transmitting portion converts an electric signal into a light signal and transmits the light signal to outside. For example, the light transmitting portion may transmit a light signal to outside in a manner of turning on or off the light emitting element corresponding to a predetermined frequency. According to an implementation, the light transmitting portion may include a plurality of light emitting element arrays. According to an implementation, the light transmitting portion may be integrated with lamps provided on the vehicle 700.

For example, the light transmitting portion may be at least one of a head lamp, a rear lamp, a brake lamp, a turn indicator lamp and a clearance lamp. For example, the light transmission module 715 may exchange data with another vehicle 602 through light communication.

The V2X communication module 716 is a module for performing wireless communication with the external server 601 or the another vehicle 602. The V2X communication module 716 includes a module which may implement a vehicle-to-vehicle (V2V) communication protocol or a vehicle-to-infra (V2I) communication protocol. The vehicle 700 may perform wireless communications with the external server 601 and the another vehicle 602 through the V2X communication module 716.

The input unit 720 may include a camera, the camera unit 200a, 200b, 200c, a microphone 723 and a user input unit 724.

The microphone 723 may process an external sound signal into electric data. The processed data may be variously used according to a function currently performed in the vehicle 700. The microphone 723 may convert a user's voice command into electric data.

The converted electric data may be transferred to the controller 770.

According to an implementation, the camera or microphone 723 may alternatively be a component included in the sensing unit 760, other than a component included in the input unit 720.

The user input unit 724 may allow the user to input information. When information is input through the user input unit 724, the controller 770 may control an operation of the vehicle 700 to correspond to the input information. The user input unit 724 may include a touch input device or a mechanical input device. According to an implementation, the user input unit 724 may be disposed on one area of the steering wheel. In this instance, the user (driver) may manipulate the user input unit 724 with fingers while holding the steering wheel.

The user input unit 724 may receive various types of inputs, such as a turn signal input, from the user.

The sensing unit 760 senses a signal associated with driving and the like. To this end, the sensing unit 760 may include various types of sensors, such as a collision sensor, a wheel sensor, a velocity sensor, a tilt sensor, a weight sensor, a heading sensor, a yaw sensor, an acceleration sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, a rain sensor, an illumination sensor, a tire air pressure sensor, an ultrasonic sensor, a radar, a light detection and ranging (LiADAR), and/or the like.

Accordingly, the sensing unit 760 may acquire sensing signals with respect to various types of information, such as information related to a car collision, an orientation of the vehicle, a location (GPS) of the vehicle, an angle of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, internal humidity of the vehicle, raining, a turning angle of a steering wheel, ambient brightness, tire air pressure, and/or the like.

In some implementations, in addition to such sensors, the sensing unit 760 may further include an acceleration paddle sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

In some implementations, the ultrasonic sensor, the radar or the LiADAR may detect an object and track the object. The ultrasonic sensor, the radar or the LiADAR may calculate a distance from the detected object and a relative speed with respect to the object.

The ultrasonic sensor, the radar or the LiADAR may detect various situations associated with driving the vehicle, such as a dangerous situation. A processor included in the ultrasonic sensor, the radar or the LiADAR may detect such a dangerous situation, for example, based on the distance from the object.

In some implementations, the sensing unit 760 may include a posture detecting sensor. The posture detecting sensor may sense a posture of the vehicle. The posture detecting sensor may generate vehicle posture information.

The posture detecting sensor may include, for example, a yaw sensor, an acceleration sensor, a gyro sensor, and/or a tilt sensor.

In some implementations, the sensing unit 760 may include a wind sensor. The wind sensor may detect a direction or speed of the wind. The wind sensor may generate wind direction information or wind speed information. The wind sensor may include an ultrasonic type wind sensor. The wind sensor may measure the speed and direction of the wind using the property that a transfer speed of ultrasonic waves transferred through an air medium increases or decreases due to the wind.

In some implementations, the sensing unit 760 may include a biometric information detecting portion. The biometric information detecting portion detects biometric information related to a passenger for acquisition. The biometric information may include fingerprint information, iris-scan information, retina-scan information, hand geometry information, facial recognition information, and voice recognition information. The biometric information detecting portion may include a sensor for detecting the biometric information related to the passenger. Here, an internal camera and the microphone 723 may operate as sensors. The biometric information detecting portion may acquire hand geometry information and facial recognition information through the internal camera.

The output unit 740 is configured to output information processed in the controller 770, and may include a display module 741, an audio output module 742 and a haptic output module 743.

The display module 741 may output information processed in the controller 770. For example, the display module 741 may output vehicle-related information. Here, the vehicle-related information may include vehicle control information for a direct control of the vehicle, or vehicle driving assist information for guiding the driving of a driver of the vehicle. Also, the vehicle-related information may include vehicle status information notifying a current status of the vehicle or vehicle driving information related to a driving state of the vehicle.

The display module 741 may include at least one of a liquid crystal display (LCD), a thin film transistor-liquid crystal display (TFT-LCD), an organic light emitting diode (OLED), a flexible display, a 3-dimensional (3D) display, an e-ink display, and combinations thereof.

The display module 741 may be layered or integrated with a touch sensor to implement a touch screen. The touch screen may function as the user input unit 724 providing a user input interface between the vehicle 700 and the user and simultaneously provide an output interface between the vehicle 700 and the user. In this instance, the display module 741 may include a touch sensor which senses a touch input applied to the display module 741, so as to receive a control command applied in a touching manner. By using this structure, when a touch is applied to the display module 741, the touch sensor may sense the touch, and the controller 770 may generate a control command corresponding to the touch. Contents input by the touching method may be characters, numbers, instructions in various modes, or menu items to be designated.

In some implementations, the display module 741 may include a cluster display which allows the driver to check vehicle status information or vehicle driving information while driving the vehicle. The cluster may be located on a dashboard of the vehicle. In this instance, the driver may check information output on the cluster while viewing towards the front of the vehicle.

According to an implementation, the display module 741 may be implemented as a head up display (HUD). When the display module 741 is implemented as the HUD, information may be output through a transparent display provided on a wind shield. Or, the display module 741 may be provided with a projection module and thus output information through an image projected on the wind shield.

The audio output module 742 converts an electric signal sent from the controller 770 into an audio signal and outputs the audio signal. To this end, the audio output module 742 may include a speaker and the like. The audio output module 742 may output sound corresponding to an operation of the user input unit 724.

The haptic output module 743 generates a tactile output. For example, the haptic output module 743 may vibrate a steering wheel, a safety belt or a seat to make the user recognize such output.

The vehicle operating unit 750 may control operations of various vehicle devices. The vehicle operating unit 750 may receive a control signal from the steering apparatus. The vehicle operating unit 750 may control each device based on the control signal.

The vehicle operating unit 750 may include a power source operating portion 751, a steering operating portion 752, a brake operating portion 753, a lamp operating portion 754, an air conditioner operating portion 755, a window operating portion 756, an airbag operating portion 757, a sunroof operating portion 758, and a suspension operating portion 759.

The power source operating portion 751 may perform an electronic control for the power source within the vehicle 700.

For example, when a fossil fuel-based engine is a power source, the power source operating portion 751 may perform an electronic control for the engine.

Accordingly, an output torque or the like of the engine may be controlled. When the power source operating portion 751 is the engine, the engine output torque may be limited according to the control of the controller 770, thereby limiting speed of the vehicle.

As another example, when an electric motor is a power source, the power source operating portion 751 may perform a control for the motor, thereby controlling a rotation speed, torque and the like of the motor.

The power source operating portion 751 may receive an acceleration control signal from the steering apparatus or the control device 100. The power source operating portion 751 may control the power source according to the received acceleration control signal.

The steering operating portion 752 may perform an electronic control for the steering apparatus within the vehicle 700. Accordingly, a moving (driving, ongoing) direction of the vehicle may be changed.

The steering operating portion 752 may receive a steering control signal from the steering apparatus or the control device 100.

The steering operating portion 752 may control the steering apparatus to be steered according to the received steering control signal.

The brake operating portion 753 may perform an electronic control for the brake apparatus 153 within the vehicle 700. For example, the braking operating portion 753 may control an operation of a brake (or brake apparatus) provided on a wheel to reduce speed of the vehicle 700 or stop the vehicle 700. As another example, the brake operating portion 753 may differently control operations of brakes disposed on a left wheel and a right wheel to adjust a moving direction of the vehicle 700 to left or right. The brake operating portion 753 may receive a deceleration control signal from the steering apparatus or the control device 100.

The brake operating portion 753 may control the brake apparatus according to the received deceleration control signal.

The lamp operating portion 754 may control lamps disposed within or outside the vehicle to be turned on or ff. Also, the lamp operating portion 754 may control intensity, direction and the like of light. For example, the lamp operating portion 754 may control head lamps (low beam, high beam), turn indicator lamps, brake lamps and the like.

The air conditioner operating portion 755 may perform an electronic control for an air conditioner within the vehicle 700. For example, when internal temperature of the vehicle is high, the air conditioner operating portion 755 may control the air conditioner to be activated to supply cold air into the vehicle.

The window operating portion 756 may perform an electronic control for a window apparatus within the vehicle 700. For example, the window operating portion 756 may control left and right windows provided on side surfaces of the vehicle to be open or closed.

The airbag operating portion 757 may perform an electronic control for an airbag apparatus within the vehicle 700. For example, the airbag operating portion 757 may control an airbag to be deployed upon exposed to danger.

The sunroof operating portion 758 may perform an electronic control for a sunroof apparatus within the vehicle 700. For example, the sunroof operating portion 758 may control the sunroof to be open or closed.

The suspension operating portion 759 may perform an electronic control for a suspension apparatus within the vehicle 700. For example, when a bump is present on a road surface, the suspension operating portion 759 may control the suspension apparatus to reduce vibration transferred to the vehicle 700. The suspension operating portion 759 may receive a suspension control signal from the steering apparatus or the control device 100. The suspension operating portion 759 may control the suspension apparatus according to the received suspension control signal.

The memory 730 is electrically connected to the controller 770. The memory 730 may store basic data for units, control data for controlling operations of units and input/output data. The memory 730 may store various data for overall operations of the vehicle 700, such as programs for processing or controlling the controller 770.

The memory 730 may include one or more types of storage mediums including a flash memory type, a hard disk type, a solid state disk (SSD) type, a silicon disk drive (SDD) type, a multimedia card micro type, a card-type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The vehicle 700 may also be operated in relation to a network storage device that performs the storage function of the memory 730 over a network, such as the Internet.

In some implementations, the memory 730 may be integrated with the controller 770.

The interface unit 780 may enable the vehicle 700 to interface with various types of external devices connected thereto. For example, the interface unit 780 may be provided with a port connectable with the mobile terminal 600, and connected to the mobile terminal 600 through the port. In this instance, the interface unit 780 may exchange data with the mobile terminal 600.

In some implementations, the interface unit 780 may enable supplying electric energy to the connected mobile terminal 600. When the mobile terminal 600 is electrically connected to the interface unit 780, the interface unit 780 supplies electric energy supplied from the power supply unit 790 to the mobile terminal 600 according to the control of the controller 770.

The interface unit 780 may enable the vehicle 700 to interface with various types of external devices connected thereto. The interface unit 780 may include any of wired or wireless ports, external power supply ports, wired or wireless data ports, memory card ports, ports for connecting a device having an identification module, audio input/output (I/O) ports, video I/O ports, earphone ports, and the like. In some cases, the vehicle 700 may perform assorted control functions associated with a connected external device, in response to the external device being connected to the interface unit 780.

The controller 770 may control an overall operation of one or more units, apparatuses, or components within the vehicle 700.

The controller 770 may be referred to as an electronic control unit (ECU). The controller 770 may be implemented in hardware configuration by using at least one of digital signal processors (DSPs), digital signal processing devices (DSPDs), programmable logic devices (PLDs), field programmable gate arrays (FPGAs), processors, controllers, micro controllers, microprocessors, and electric units performing other functions.

The power supply unit 790 may supply power for operations of components according to the control of the controller 770. For example, the power supply unit 790 may receive power supplied from a suitable power source, such as an internal battery of the vehicle 700.

The steering apparatus or the control device 100 may exchange data with the controller 770. Various information, data or control signals generated in the steering apparatus may be output to the controller 770. The steering apparatus may be the control device described with reference to FIGS. 1 to 3.

A driver status monitoring (DSM) system is a system of sensing a driver's status and controlling the vehicle 700 according to the driver's status. The DSM system may include an input device such as an internal camera, a microphone and the like.

The DSM system may monitor the driver's status, such as whether the driver is looking at the front, dozing off, eating food, manipulating a device or the like. Also, the DSM system may sense the driver's concentration on driving during the driving.

The DSM system may include a photoplenthysmogram (PPG) sensor. The PPG sensor may be disposed on one area of the steering wheel which is contactable with the user's (e.g., the driver's) body. The PPG sensor may be disposed on one area of a steering wheel rim. The DSM system may acquire a biometric signal of the driver through the PPG sensor and analyze the acquired biometric signal.

For example, the DSM system may acquire a biometric signal and generate driver condition information as the driver status information.

For example, the DSM system may acquire biometric information and generate information related to the driver's excited condition as the driver status information.

For example, the DSM system may analyze a driver image acquired through the internal camera, and generate information related to the driver's dozing state as the driver status information.

For example, the DSM system may analyze a driver image acquired through the internal camera, and generate information related to the driver's device manipulating state.

The DSM system may provide the driver status information to the steering apparatus or the control device 100.

The vehicle display device 400 may exchange data with the controller 770. The controller 770 may receive navigation information from the vehicle display device 400 or a separate navigation system. The navigation information may include any suitable information regarding navigation of the vehicle, such as information related to a preset destination, path information based on the destination, map information related to driving of the vehicle, or vehicle location information.

In some implementations, the vehicle 700 disclosed herein may include the control device 100. The control device 100 may control various lamps provided in the vehicle 700.

The various lamps, for example, may include head lamps configured to emit visible light to the front of the vehicle, rear lamps configured to emit visible light to the rear of the vehicle, turn indicator lamps and the like.

The head lamp 155 may be configured by one or more of a headlight, a lamp emitting at least one of low beam and high beam based on a user request, and a turn indicator lamp.

The control device 100 disclosed herein may be an independent device (structure or component) that controls at least one component (e.g., the head lamp 155, the sensing unit 760 and the like) provided in the vehicle 700.

The control apparatus 100 may generally control various units, components, apparatuses, and the like described in FIG. 3. That is, the control device 100 may be the controller 770 of the vehicle 700. That is, hereinafter, operations, functions and controls described in relation to the control device 100 may be performed by the controller 770 of the vehicle 700.

Also, the control device 100 may be referred to as a lamp control device, a vehicle control device, a vehicle assist device or the like, from the perspective of controlling the lamps provided on the vehicle.

For ease of explanation, the below description will be given in the scenario that the control device 100 is a single independent device (structure or component), although implementations are not limited thereto. In some implementations. The control device 100 may be a collection of devices, structures, or components that do not form a single independent device.

Hereinafter, the control device 100 according to some implementations will be described in more detail, with reference to FIG. 4. The following description will be applied to a scenario where the control device 100 provided in the vehicle is configured as the independent device. Implementations, however, are not limited thereto and may be implemented by a control device that includes distributed devices, structures, or components that are not necessarily in a single independent device.

Figure 4:
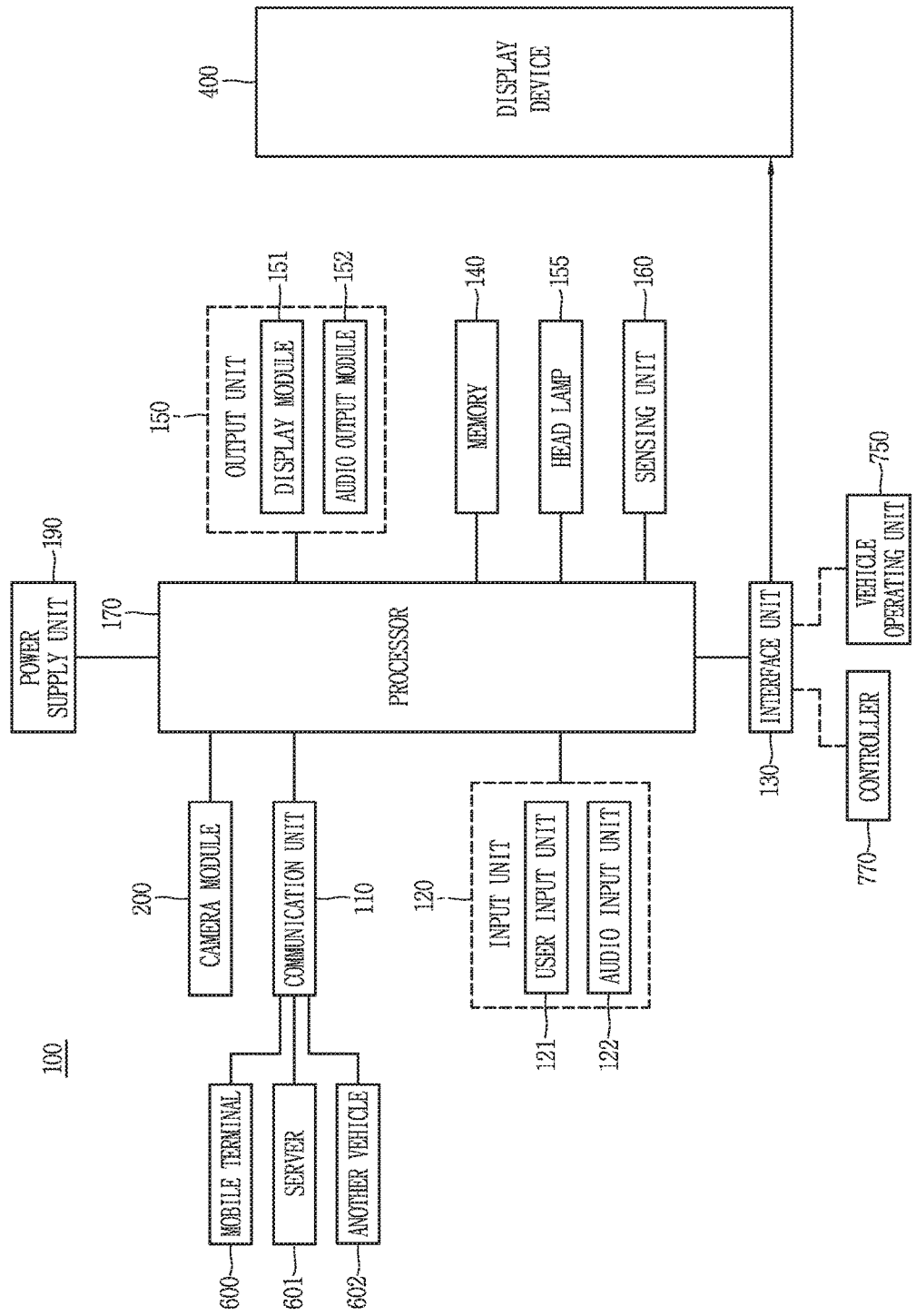
FIG. 4 is a block diagram illustrating an example of a control device in accordance with some implementations.

FIG. 4 is a block diagram illustrating a control device in accordance with some implementations.

As illustrated in FIG. 4, the control device 100 according to some implementations may include a camera module 200, a communication unit 110, an input unit 120, an interface unit 130, a memory 140, an output unit 150, a head lamp 155, a sensing unit 160, at least one processor 170 and a power supply unit 190.

The camera module 200 (or camera) may acquire surrounding images of the vehicle.

Data, signals or information generated in the camera module 200 are transmitted to the at least one processor 170.

The camera module 200 may be the camera unit 200*a*, 200*b*, 200*c* illustrated in FIGS. 2A to 2C.

For example, the camera module 200 may be the mono camera unit 200*a*. The mono camera unit 200*a* may acquire a mono image as the surrounding image of the vehicle.

For example, the camera module 200 may be the stereo camera unit 200*b*.

The stereo camera unit 200*b* may acquire a stereo image as the surrounding image of the vehicle.

For example, the camera module 200 may be an around view camera unit 200*c*. The around view camera unit 200*c* may acquire an around view image as the surrounding image of the vehicle.

The communication unit 110 may exchange data with the mobile terminal 600, the server 601 or the another vehicle 602 in a wireless manner. Specifically, the communication unit 110 may exchange data with the mobile terminal of the driver of the vehicle in a wireless (or wired) manner. Examples of such wireless communication method may include various communication methods, such as Bluetooth, WiFi direct, WiFi, APiX, NFC, etc.

The communication unit 110 may receive weather information, road traffic condition information, for example, TPEG information from the mobile terminal 600 or the server 601. Meanwhile, the control device 100 may also transmit recognized real-time information to the mobile terminal 600 or the server 601.

Meanwhile, when the user gets in the vehicle, the user's mobile terminal 600 and the control device 100 may perform pairing with each other automatically or by the user's execution of an application. In view of this, the control device 100 may be referred to as a vehicle assist device.

The communication unit 110 may receive traffic light change information from the external server 601.

Here, the external server 601 may be a server located in a traffic control station for controlling traffic.

The communication unit 110 may receive weather information from the external server 601. Here, the external server 601 may be a server of an organization or an operator providing the weather information. For example, the communication unit 110 may receive, for each region, fine dust information, smog information or yellow dust information from the external server 601.

The input unit 120 may include a user input unit 121 and an audio input unit 122.

The user input unit 121 may include a plurality of buttons or a touch screen. The user input unit 121 may turn on the control device 100 through the plurality of buttons or the touch screen. The user input unit 121 may also perform various input operations.

The audio input unit 122 may receive the user's voice input. The audio input unit 122 may include a microphone switching the voice input into an electric signal. The audio input unit 122 may receive the user's voice to turn on the control device 100. The user input unit 121 may also perform other various input operations.

The input unit 120 may be the input unit 720 illustrated in FIG. 3.

Also, the input unit 120 may refer to the vehicle driving portion 750. For example, the input unit 120 may include a lamp operating portion 754 for turning on/off the head lamp 155.

The interface unit 130 may allow for receiving information, signals or data, or externally transmitting information, signals or data processed or generated in the at least one processor 170. To this end, the interface unit 130 may perform data communication with the controller 770, the vehicle display device 400, the sensing unit 760, the vehicle driving portion 750 and the like provided in the vehicle, through wired or wireless communication technologies.

The interface unit 130 may allow for receiving navigation information through data communications with the controller 770, the vehicle display device 400 or a separate navigation system.

Here, the navigation information may include information related to a preset destination, path information based on the destination, map information related to driving of the vehicle, or vehicle location information. Meanwhile, the navigation information may include location information related to the vehicle on a road.

Meanwhile, the interface unit 130 may allow for receiving sensor information from the controller 770 or the sensing unit 160, 760.

Here, the sensor information may include information related to at least one of an orientation of the vehicle, a location (GPS) of the vehicle, an angle of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, external temperature of the vehicle, internal humidity of the vehicle, external humidity of the vehicle, and raining.

The sensor information may be acquired from a heading sensor, a yaw sensor, a gyro sensor, a position module, a vehicle forward/backward movement sensor, a wheel sensor, a vehicle velocity sensor, a vehicle tilt detecting sensor, a battery sensor, a fuel sensor, a tire sensor, a steering sensor by a turn of a handle, a vehicle internal temperature sensor, a vehicle external temperature sensor, a vehicle internal humidity sensor, a vehicle external humidity sensor, a rain sensor, a GPS sensor and the like.

Among such sensor information, vehicle driving information may include various types of information related to driving of the vehicle, such as vehicle orientation information, vehicle location information, vehicle angle information, vehicle velocity information, vehicle tilt information, and the like.

In some implementations, the interface unit 130 may receive passenger information. Here, the passenger information may be information received through an input device. Or, the passenger information may be information acquired through a passenger detecting sensor (e.g., a camera capturing a passenger's state). Or, the passenger information may be information received from a mobile terminal belonging to the passenger.

The memory 140 may store various data for an overall operation of the control device 100, such as programs for processing or control of the at least one processor 170.

The memory 140 may store data for checking a predetermined object. For example, the memory 140 may store information for checking (or verifying) what the object corresponds to, according to a preset algorithm, when the predetermined object is detected from an image acquired through the camera module 200.

The memory 140 may be various storage media, such as ROM, RAM, EPROM, a flash drive, a hard drive and the like, in hardware configuration. The memory 140 may be integrally formed with the at least one processor 170.

The output unit 150 may generate a visual, audible or tactile output, and may include at least one of the display unit 151, the audio output module 152, the haptic module and an optical output module. The display unit 151 may implement a touch screen as being layered or integrated with a touch sensor. The touch screen may function as the user input unit 121 providing a user input interface between the control device 100 and the user and simultaneously providing an output interface between the control device 100 and the user.

The output unit 150 of the control device 100 may be the output unit 740 illustrated in FIG. 3, or a separate device.

The display unit 151 may also be the display device 400 illustrated in FIG. 3, or may be a separate device.

The head lamp 155 may be provided on the front of the vehicle 700. The head lamp 155 may be configured as various light sources. For example, the head lamp 155 may emit light by a light source including at least one of a bulb, a micro LED, a matrix LED, an OLED, and/or a laser diode.

The head lamp 155 may also be implemented by at least one of a light source, a reflector reflecting light output from a light source, a shield forming a preset low-beam pattern, a structure changing a color of light, and a projection lens. The head lamp 155 may output (emit, irradiate) at least one of low beam and high beam to the front of the vehicle according to a user request.

The head lamp 155 may be turned on/off, for example, when a user request is received through the lamp operating portion 754 or the input unit 120. when the head lamp 155 is turned on, light (e.g., visible light) may be output to the front of the vehicle.

The head lamp 155 and the lamp operating portion 754 are preferably provided at the vehicle 700. Meanwhile, for the sake of explanation, the head lamp 155 and the lamp operating portion 754 will be described as being included in the control device 100.

The control device 100 according to some implementations may include a sensing unit 160. Here, the sensing unit 160 may be the sensing unit 760 illustrated in FIG. 3. The sensing unit 160 may be the sensing unit 760 itself provided in the vehicle, or a separate component.

Even when the sensing unit 160 is the separate component, the structure of the sensing unit 760 provided in the vehicle will be applied equally/similarly.

For the sake of explanation, description will be given in the scenario that the sensing unit 160 is included in the control device 100, although implementations are not limited thereto. Also, the same/like description of the sensing unit 760 provided in the vehicle and the use of the sensing unit 760 provided in the vehicle will be applied to description of the sensing unit 160 and the use of the sensing unit 160.

The processor 170 may control an overall operation of each unit within the control device 100. The processor 170 may include one or more processors, and may be electrically connected to each unit, component or apparatus within the control device 100.

The processor 170 may process surrounding images acquired through the camera module 200. The processor 170 may process the vehicle surrounding image into a computer vision-based signal.

The processor 170 may merge a plurality of images received from the around view camera module 200c of FIG. 2C. Here, the plurality of images may be images received from the plurality of cameras 221a, 221b, 221c and 221d of FIG. 2C. The processor 170 may generate an around view image or an omnidirectional image by merging the plurality of images. For example, the around view image may be a top view image.

The processor 170 may detect at least one object based on each of the images acquired from the plurality of cameras 221a, 221b, 221c and 221d of FIG. 2C). Or, the processor 170 may detect at least one object based on the around view image.

Also, the processor 170 may detect at least one object based on the omnidirectional image. The control device 100 may track a movement of the detected object.

During the detection of the object, the processor 170 may perform a lane detection (LD), a vehicle detection (VD), a pedestrian detection (PD), a brightspot detection (BD), a traffic sign recognition (TSR), a road surface detection, a structure detection, and/or the like.

For example, the processor 170 may detect an object based on at least one of intensity, a color, histogram, a feature point, a shape, a space position, or a motion.

In some implementations, the processor 170 may verify the detected object. For example, the processor 170 may verify the detected object using an identifying method using a neural network, a support vector machine (SVM) method, an identifying method by AdaBoost using a Haar-like characteristic, a histograms of oriented gradients (HOG) technology, or the like. In such scenarios, the processor 170 may perform such verification, for example, by comparing the object detected from the surrounding image of the vehicle with data stored in the memory 140.

In some implementations, the processor 170 may track the verified object. For example, the processor 170 may calculate a motion or a motion vector of the verified object and track a movement and the like of the object based on the calculated motion or motion vector.

The processor 170 may be implemented in hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform the functions described herein.

The power supply unit 190 may supply power for an operation of one or more components according to the control of the processor 170. For example, the power supply unit 190 may receive power supplied from an internal battery of the vehicle, and the like.

As aforementioned, the control device 100 described in FIG. 4 may be a component or device independently provided in the vehicle 700 or the controller 770 itself.

The control device 100, which may include at least one of those components, may control various lamps provided on the vehicle to facilitate driving of the vehicle.

Figure 5:
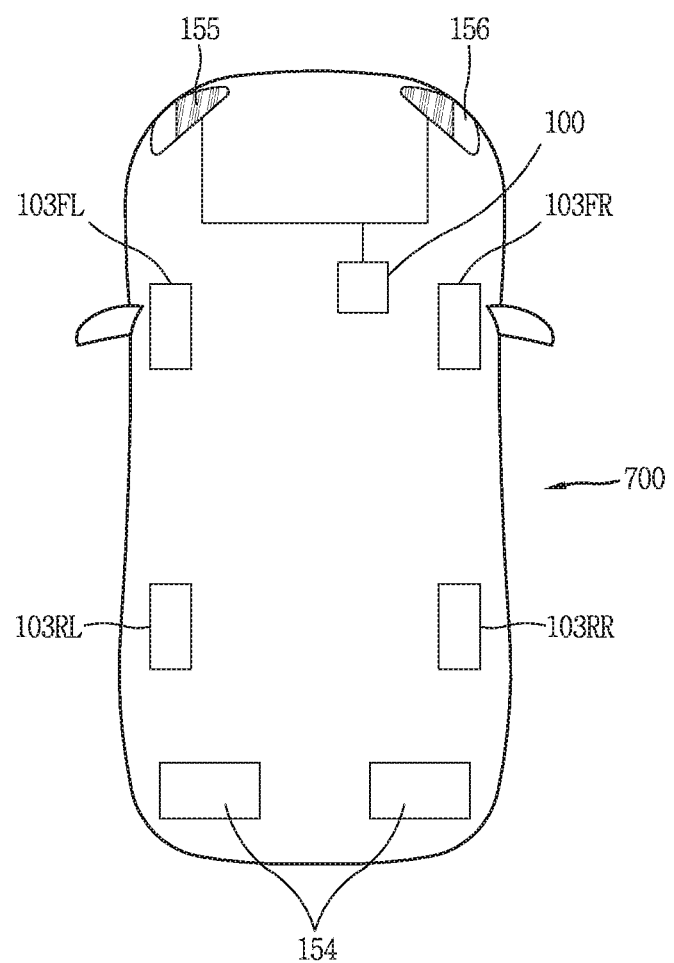
FIG. 5 is a diagram illustrating an example of a head lamp provided on a vehicle in accordance with some implementations.

FIG. 5 illustrates an example of a head lamp provided on a vehicle in accordance with some implementations.

As illustrated in FIG. 5, the vehicle 700 disclosed herein may include lamps 154, 155 and 156 controllable by the control device 100 (or the controller 770), and a brake apparatus 153.

For example, the lamps may include a head lamp 155 provided on a front of the vehicle and emitting (outputting) visible light to the front of the vehicle, rear lamps 154 provided on a rear of the vehicle and emitting visible light to the rear of the vehicle, and turn indicator lamps 156.

The head lamp 155, as aforementioned, may be turned on when a user request is received through the lamp operating portion 754 or the input unit 120.

When a low beam output request is received by the user request, the head lamp 155 may output low beams to the front of the vehicle 700. The low beam may form a preset cutoff line, which may have various shapes according to designs.

Also, the head lamp 155 may output high beams to the front of the vehicle 700 when a high beam output is requested by the user. When the high beam output is requested, low beams and high beams may generally be output simultaneously, and an area to which the high beams are output and an area to which the low beams are output may partially overlap each other.

The low beam or the high beam may be output to the front of the vehicle under the control of the control device 100. For example, when a light output request is received through the lamp operating portion 754 or the input unit 120, the processor 170 of the control device 100 may control the head lamp 155 to output light to the front of the vehicle.

Also, the head lamp 155 may be turned on when surrounding brightness detected through the sensing unit 160, 760 is darker than reference brightness. For example, when the surrounding brightness of the vehicle detected through the sensing unit 160 is darker than a preset brightness, the processor 170 may control the head lamp 155 to output light to the front of the vehicle.

In some implementations, the head lamp 155 may be configured to vary a light output direction.

For example, the head lamp 155 may vary a direction of outputting light (i.e., light output direction) by the control of the processor 170 of the control device 100.

For example, the processor 170 may control the head lamp 155 to output light in an upward direction (e.g., height direction H).

This example illustrates that the head lamp 155 may change the light output direction to the upward direction, but implementations are not limited to this. The head lamp 155 may vary the light output direction into any suitable direction.

The light output direction of the head lamp 155 may be changed (varied) by at least one of various components (e.g., a light source, a reflector, a shield, a forming body (or structure) or a lens) forming the head lamp 155, or by a transforming member which is disposed on a housing of the head lamp 155 or at an outside of the head lamp 155.

Hereinafter, the operation that the processor 170 controls (changes, varies) the light output direction of the head lamp 155, as aforementioned, may be executed by at least one of the components of the head lamp, the housing, or the transforming member. However, implementations are not limited to this, and may implement any suitable structure or function or the like which is configured to change (vary) the output direction of light which is output from the head lamp.

The control device 100 according to some implementations may control the head lamp 155 in an improved manner, such that the user may safely drive the vehicle. Hereinafter, a control device configured to control a head lamp by an improved control device will be described in more detail.

Figure 6:
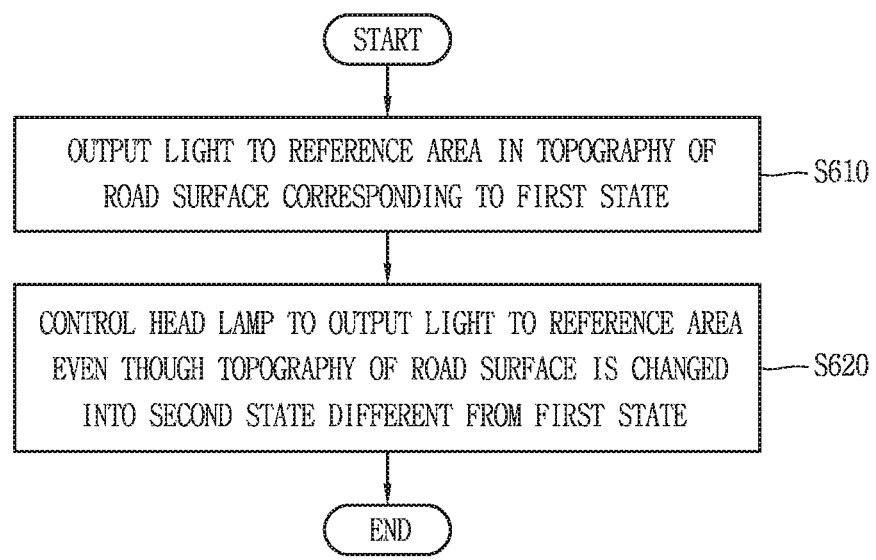
FIG. 6 is a flowchart illustrating an example of a control process in accordance with some implementations.
Figure 7A:
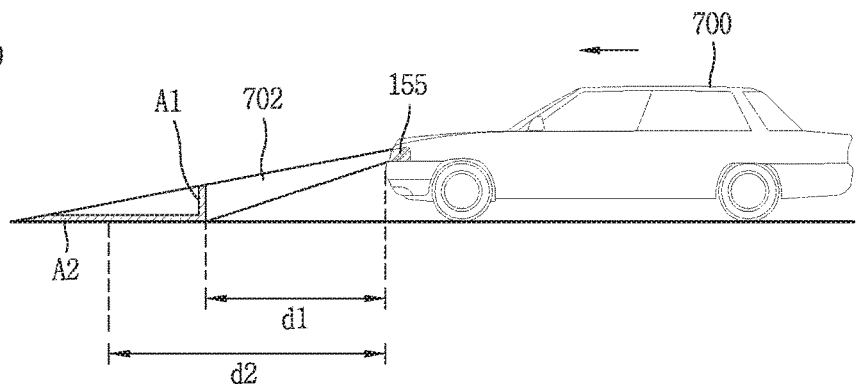
FIGS. 7A and 7B are diagrams illustrating examples of the control process of FIG. 6.
Figure 7A:
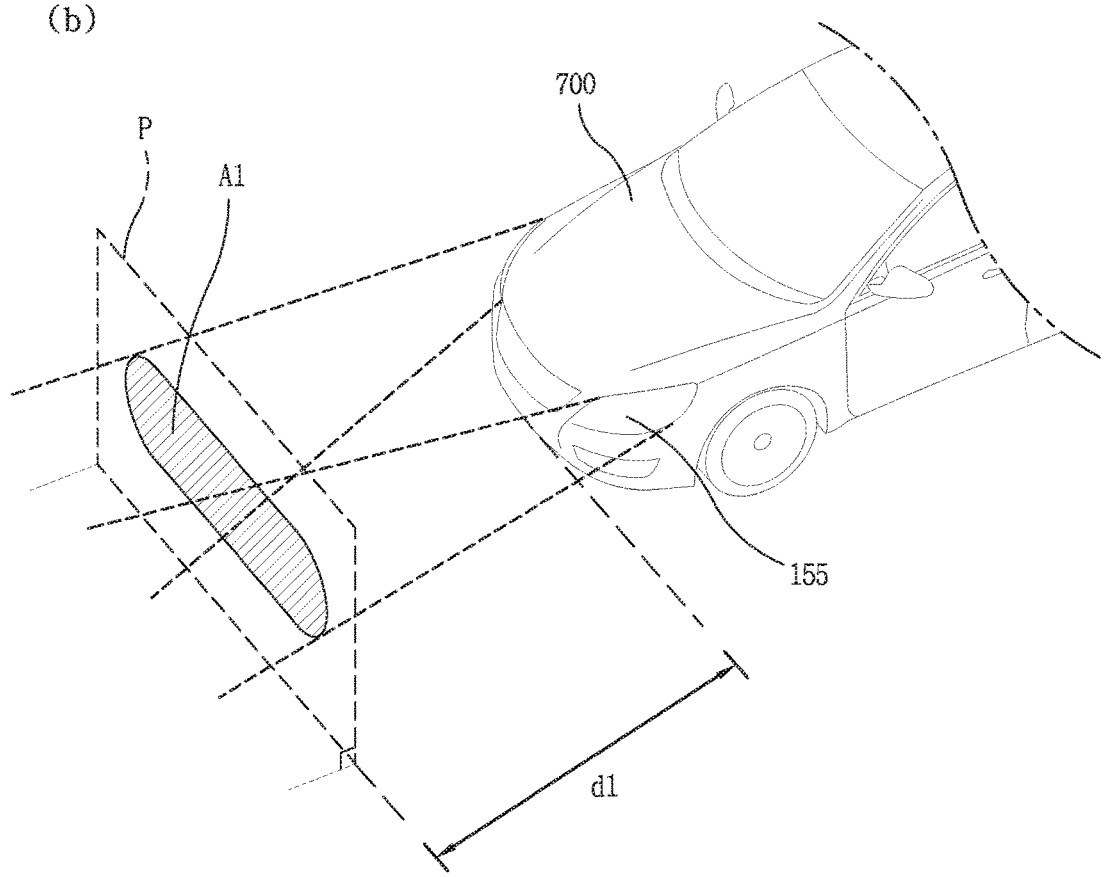
Figure 7B:
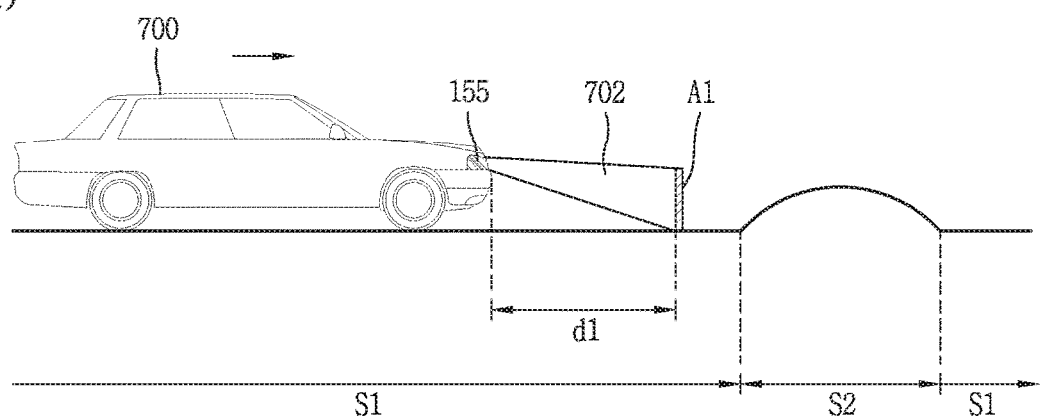
Figure 7B:
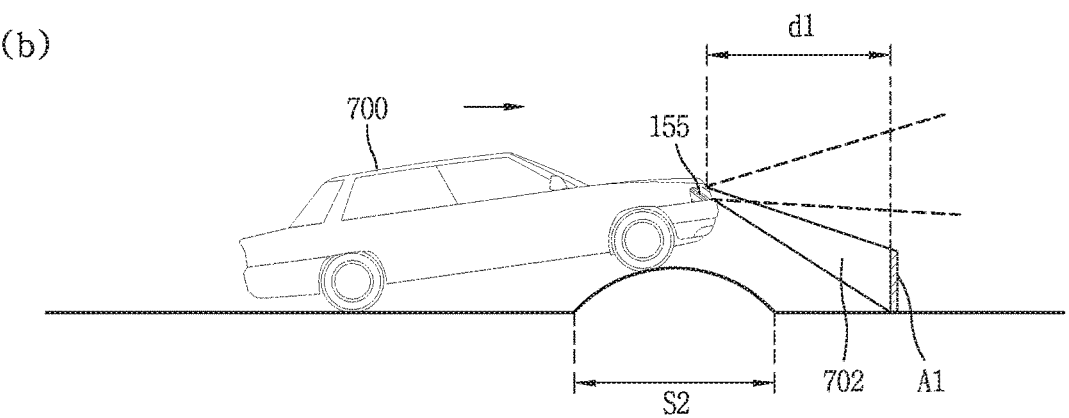

FIG. 6 is a flowchart illustrating an example of a control process in accordance with some implementations, and FIGS. 7A and 7B illustrate examples of the control process of FIG. 6.

The control device 100 according to some implementations may include a sensing unit 160 which is configured to detect a topographical state of a road surface (e.g., a lane, a road, etc.) that the vehicle 700 is currently travelling. The sensing unit 160 may be a sensing unit 760 provided on the vehicle 700 or a separate sensing unit 160 provided on the control device 100.

The sensing unit 160 may detect a topographical state of a road surface on which the vehicle 700 is currently driven. The topographical state of the road surface may indicate an external shape or topography of the road surface (e.g., the ground, a road, a lane) where the vehicle is driven. The topographical state of the road surface may be represented by different states, such as a first state and a second state different from the first state.

As an example, the first state may correspond to a road surface that may be referred to as "flat," and the second state may correspond to a road surface that may be referred to as "not flat." In such scenarios, the first state and the second state may distinguish whether a vehicle is travelling generally parallel to the ground (generally on a flat surface).

In this example, the first state may include various types of road surfaces. For example, such a first state may include a road surface which is perpendicular to a direction of gravitation pull (e.g., a direction in parallel to a horizon), and also a topography on which a body of the vehicle is in parallel to a road surface for at least a predetermined duration of time.

As another example, the first state may include a state in which the road surface has an obstacle having a size no greater than a threshold size (e.g., an obstacle which does not cause a change in a tilt of the vehicle body). In such scenarios, the vehicle body may remain parallel to the ground despite the presence of the obstacle because of suspension of the wheels of the vehicle absorbing any tilt caused by the obstacle. Therefore, a topography of a road surface corresponding to the first state may also include a case where the vehicle body is not tilted due to a suspension connected to wheels of the vehicle even though an obstacle is on the road surface. In such scenarios, the topographical state of the road surface may be referred to as the first state.

As such, the topography of the road surface in the first state may correspond a topography on which the tilt of the vehicle body is 0° based on the road surface, or a topography on which the vehicle body and the road surface are in parallel to each other. Implementations, however, are not limited to such designations of the first state. In general, the first state may correspond to any suitable state of the vehicle that corresponds to a "flat" surface of the road, for example by corresponding to a tilt of the vehicle being less than a threshold tilt.

Further in this example, the second state may correspond to a topographical state of a road surface in which the vehicle body is not in parallel to the road surface due to a shape of the road surface (e.g., a shape of the ground). For example, the second state may correspond to the tilt of the travelling vehicle being different from the tilt in the first state (e.g., due to an obstacle, a speed bump, a port hole, or the like). In some implementations, the second state may be distinguished from the first state by the tilt in the second state differing from the tilt in the first state by at least a threshold difference of tilt, and/or differing from the tilt in the first state by at least a threshold period of time.

As an example, the second state may include a topography on which the tilt of the vehicle (e.g., a body of the vehicle) differs from that of the first state for at least a predetermined duration of time. This topography, for example, may include a topography with at least one of a speed bump, a port hole, or an obstacle having at least a threshold size.

The sensing unit 160 may include various sensors for detecting (sensing) a topographical state of a road surface on which the vehicle is currently driven. For example, the sensing unit 160 may detect the topographical state of the road surface where the vehicle 700 is currently driven, by using at least one of an image sensor (e.g., the camera 200), an infrared sensor, a radar sensor, a LiADAR sensor, an ultrasonic sensor, an acceleration sensor, a gyroscopic sensor, a collision sensor, a tire sensor, or a tire air pressure sensor.

The control device 100 according to some implementations may include head lamp 155 that emits (outputs) light to the front of the vehicle 700. In some implementations, the head lamp 155 may be configured to irradiate (e.g., emit, output) light to a specific reference area, relative to the vehicle, in a topography of a road surface in the first state.

Referring to FIG. 6, light is output to a reference area in a topography of a road surface corresponding to a first state (S610).

In more detail, the processor 170 of the control device 100 may turn on the head lamp 155 based on a user request or based on a surrounding environment.

In this instance, when the vehicle 700 is in a stopped state or is currently driven in the topography of the road surface corresponding to the first state, the head lamp 155 may emit light to a particular reference area, relative to the position of the vehicle.

Referring to FIG. 7A, a reference area may refer to reference area A1 where light is emitted to an area ahead of the vehicle, which is spaced apart from one point (e.g., the head lamp 155) of the vehicle 700 by a preset distance d1, within a topography of a road surface corresponding to the first state. The reference area A1 is not a fixed geographic area, but instead is an area ahead of the vehicle that is fixed relative to the position of the vehicle as the vehicle travels.

For example, the preset distance d1, as illustrated in the upper part of FIG. 7A, may be the closest distance from the vehicle 700 in an area A2 where the light 702 output from the head lamp 155 reaches the road surface. In this example, the reference area A1 may then be the vertical portion that is at the distance d1 from the head lamp 155 of the vehicle.

As illustrated in the lower diagram of FIG. 7A, the reference area A1 may refer to an area where light 702 emitted from the head lamp 155 is output to a virtual plane P, which is spaced apart from one point (e.g., the head lamp 155) of the vehicle 700 by the preset distance d1. For convenience of description, although the lower diagram of FIG. 7A illustrates a top view of the vehicle 700, the reference area A1 and virtual plane P are illustrated as viewed horizontally from the driver's seat. Here, the virtual plane P may be perpendicular to the topography of the road surface corresponding to the first state.

The preset distance d1 may be decided (changed) manually by a user setting or automatically by the processor 170. In some implementations, the preset distance d1 may be defined variously within a light-outputtable distance.

In some implementations, the reference area may also refer to the area A2 in which the light 702 output from the head lamp 155 reaches the road surface corresponding to the first state.

The shape and size of the reference area A1 and/or A2 may differ according to at least one of a type of the head lamp 155, a light source, a shield, a reflector, a forming body, a projection lens, a low beam, and/or a high beam.

The description below will describe examples in which the reference area is the area A1 in which the light 702 output from the head lamp 155 reaches the space (the virtual plane P) that is spaced apart from one point of the vehicle 700 by the predetermined distance d1.

Referring back to FIG. 6, the head lamp may be controlled to maintain the output light to the reference area even though the topography of the road surface changes into a second state different from the first state (S620). As such, the directional output of the head lamp may be controlled based on the changing topography of the road surface to maintain a consistent illumination on a reference area A1 ahead of the vehicle.

As a detailed example, the processor 170 may detect a topography of a road surface, on which the vehicle is currently driven, through the sensing unit 160. In a state that the vehicle is driven in the topography of the road surface corresponding to the first state, the sensing unit 160 may subsequently detect a change in the topography of the road surface to the second state different from the first state.

In the scenario in which the light was output to the reference area in the topography of the road surface corresponding to the first state, when the vehicle 700 is driven into a topography of the road surface corresponding to the second state different from the first state, the processor 170 may control the head lamp 155 to change the direction of the output light to maintain illumination on the reference area even though the topography of the road surface changes into the second state different from the first state.

For example, as illustrated in the upper diagram of FIG. 7B, when the vehicle 700 is currently driven in a topography of a road surface corresponding to the first state S1, the light 702 emitted from the head lamp 155 may be output to the reference area A1, which is spaced apart from one point of the vehicle 700 by the predetermined distance d1.

Afterwards, as illustrated in the lower diagram of FIG. 7B, when the vehicle 700 is driven into a topography corresponding to the second state S2 different from the first state S1, the processor 170 may control the head lamp 155 to maintain the output of the light 702 onto the reference area A1 spaced apart from the one point of the vehicle 700 by the predetermined distance d1 (i.e., the reference area A1 to which light is output in the first state S1). In some implementations, the head lamp 155 maybe controlled to consistently maintain illumination on the reference area despite changes in the topography, for example either by continuously maintaining illumination on reference area A1 or by maintaining illumination on the reference area A1 with brief interruptions, e.g., for transitioning control of the head lamp 155. The subsequent description will focus on the case of maintaining continuous illumination of the reference area A1.

In this instance, the processor 170 may control a light output direction of the head lamp 155 such that the light 702 is continuously emitted to the reference area A1.

For example, in case where the topography of the road surface corresponding to the second state S2 is a speed bump, when the front wheels 103FL and 103FR of the vehicle enter the topography of the road surface corresponding to the second state S2, the body of the vehicle may be tilted such that a front portion of the vehicle is raised up.

In this instance, the processor 170 may change the light output direction of the head lamp 155 into one direction (e.g., a downward direction), such that the light 702 may be output to the reference area A1.

When the vehicle becomes parallel to the road surface as the front wheels 103FL and 103FR of the vehicle passes through the topography of the road surface corresponding to the second state, the processor 170 may change the light output direction back into the upward direction such that the light 702 output from the head lamp 155 may continuously be output to the reference area A1.

Afterwards, when the front wheels 103FL and 103FR of the vehicle enters the topography of the road surface corresponding to the second state S2 as the vehicle is driven, the body of the vehicle may be tilted such that the front portion of the vehicle faces a lower side.

In this instance, the processor 170 may change the light output direction of the head lamp 155 into a direction that is opposite to a direction in which a front of the vehicle tilts, such that the light 702 may be output to the reference area A1.

Still with reference to FIG. 7B, the processor 170 may differently control the degree of changing the output direction of the head lamp 155, such that the light 702 emitted from the head lamp 155 may continuously be output to the reference area A1, even though a changed degree of the tilt of the body of the vehicle differs according to the topography of the road surface corresponding to the second state S2.

Accordingly, in some implementations, the light 702 may be continuously output to the reference area A1 even though the tilt of the body of the vehicle is continuously changed according to the topography of the road surface corresponding to the second state. In such scenarios, the control device may track the topography of the road and adjust the output direction of the light 702 to maintain illumination on the reference area A1 ahead of the vehicle.

The processor 170 may control the light 702 emitted from the head lamp 155 to be continuously output to the reference area, which is spaced apart from the one point of the vehicle by the predetermined distance, even though the tilt of the vehicle changes in response to the vehicle entering the topography of the road surface corresponding to the second state, different from the first state.

As such, some implementations may provide a vehicle configured to control the light output direction of the head lamp such that light may consistently be output to a predetermined area even though the tilt of the vehicle changes.

Consequently, some implementations may maintain light to be output to a predetermined area even though a topography of a road surface changes, thereby reducing user's fatigue.

Hereinafter, description will be given in more detail of various methods of controlling the head lamp according to some implementations with reference to the accompanying drawings.

FIGS. 8A, 8B, 8C and 9 illustrates examples of controlling head lamps according to a state of a road surface on which a vehicle is currently driven.

The processor 170 may detect a point where a topography of a road surface corresponding to the second state is started through the sensing unit 160.

The processor 170 may sense through the sensing unit 160 a point where the topography of the road surface is in the second state, and decide a control time point of the head lamp 155 based on the sensed point and a driving speed of the vehicle 700.

Figure 8A:
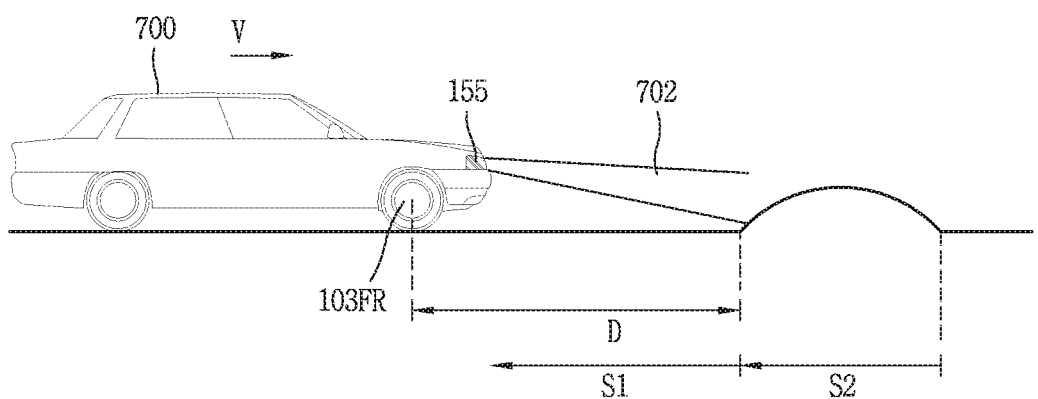
FIGS. 8A, 8B, 8C, and 9 are diagrams illustrating examples of controlling a head lamp according to a state of a road surface on which a vehicle is travelling.

For example, as illustrated in FIG. 8A, the processor 170 may detect a point where the topographical state of the road surface is changed into the second state S2 different from the first state S1. Afterwards, the processor 170 may calculate a distance between the point S2 which is in the second state and a part of the vehicle (e.g., the front wheels 103FL and 103FR of the vehicle).

Then, the processor 170 may calculate a time point that the vehicle 700 (e.g., the front or rear wheels of the vehicle) enters the topography of the road surface corresponding to the second state, on the basis of the calculated distance and a driving speed V of the vehicle which is currently driven.

The processor 170 may decide the calculated time point as the control time point of the head lamp 155.

That is, the processor 170 may calculate a time point that the body of the vehicle is tilted on the basis of the point where the topographic state of the road surface is changed from the first state S1 into the second state S2 (or a distance D between the point and the part of the vehicle (front or rear wheels)) and the driving speed of the vehicle. The processor 170 may then change the light output direction of the head lamp 155 at the calculated time point.

With the configuration, the time point that the body of the vehicle is tilted may accurately be determined, and an unintentional change of the light output direction of the head lamp may be prevented.

Meanwhile, the processor 170 may control the light output direction of the head lamp 155 such that the light 701 may continuously be output to the reference area A1, on the basis of the topography of the road surface corresponding to the second state S2 which is detected through the sensing unit 160.

The processor 170 may determine the topography of the road surface corresponding to the second state, which is different from the first state, through the sensing unit 160.

For example, the processor 170 may determine a size of a section of the road surface corresponding to the second state, a shape of the road surface, a height of the road surface, and the like, through the sensing unit 160.

The processor 170 may change the light output direction of the head lamp 155 such that the light 702 is output to the reference area A1, on the basis of the topography of the road surface (e.g., the height of the road surface) corresponding to the second state.

Figure 8B:
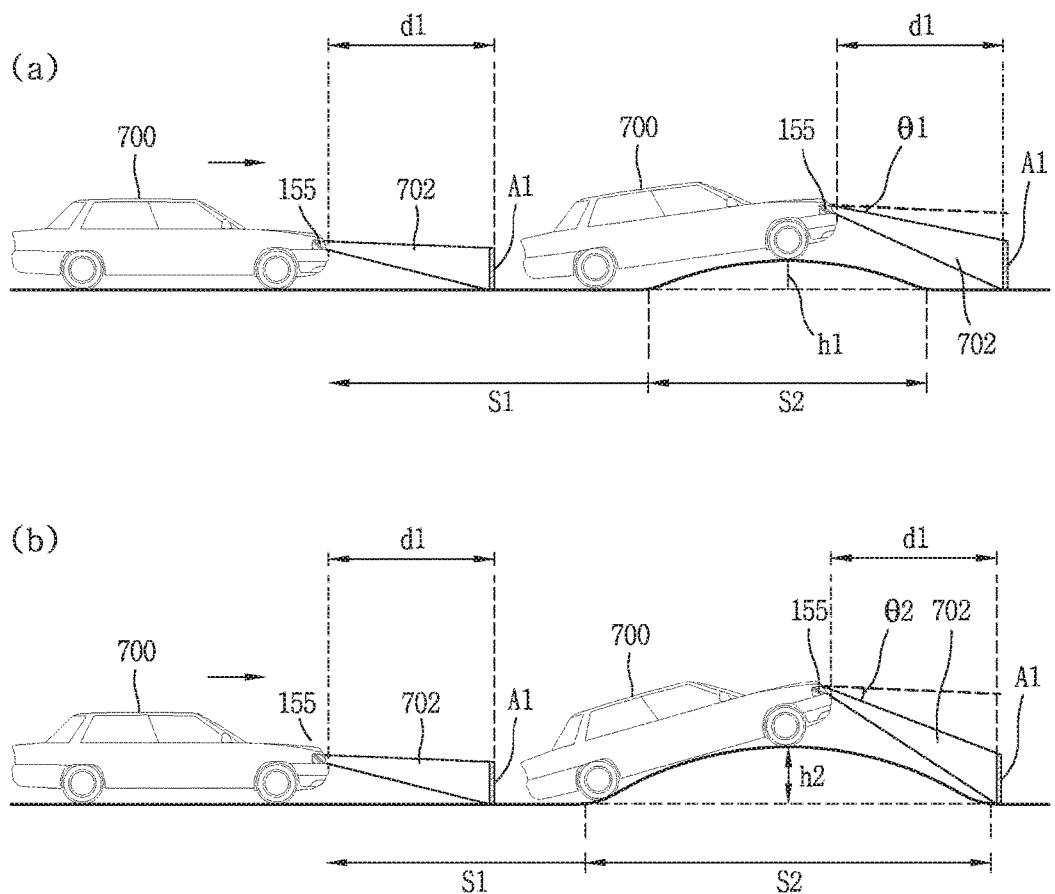

For example, as illustrated in the upper diagram of FIG. 8B, the processor 170 may determine (decide) that the topography of the road surface corresponding to the second state S2 detected through the sensing unit 160 has a first height h1.

Afterwards, the processor 170 may change the light output direction of the head lamp 155, such that the light 702 output to the reference area A1 in the first state S1 may be maintained, even though the vehicle 700 enters the topography of the road surface corresponding to the second state S2.

For example, as illustrated in in the upper diagram of FIG. 8B, when the topography of the road surface corresponding to the second state S2 has the first height h1 and the vehicle (e.g., front wheels) reaches a point with the first height h1, the processor 170 may change the light output direction into one direction (e.g., downward direction) by a first angle 81, such that the light 702 may be emitted to the reference area A1.

As another example, referring to the lower diagram of FIG. 8B, when the topography of the road surface corresponding to the second state S2 has a second height h2 higher than the first height h1 and the vehicle (e.g., front wheels) reaches a point with the second height h2, the processor 170 may change the light output direction into one direction (e.g., downward direction) by a second angle 82 greater than the first angle 81, such that the light 702 may be emitted to the reference area A1.

As such, when the topography of the road surface corresponding to the second state is at a higher elevation, so that a variation of the tilt of the vehicle body increases, the processor 170 may control a degree (angle) by which the light output direction of the head lamp 155 is changed to be in proportion to the variation of the tilt of the vehicle body.

Thus, in some implementations, the degree (angle) by which the light output direction of the head lamp 155 is changed may be in proportion to the variation of the tilt of the vehicle body.

Also, in some implementations, the changed direction of the light output direction of the head lamp 155 may be a direction opposite to the tilted direction of the vehicle body.

For example, when the vehicle body is tilted such that the front side of the vehicle faces a downward direction, the processor 170 may change the light output direction of the head lamp into an upward direction. On the other hand, when the vehicle body is tilted such that the front side of the vehicle faces an upward direction, the processor 170 may change the light output direction of the head lamp into a downward direction.

Figure 8C:
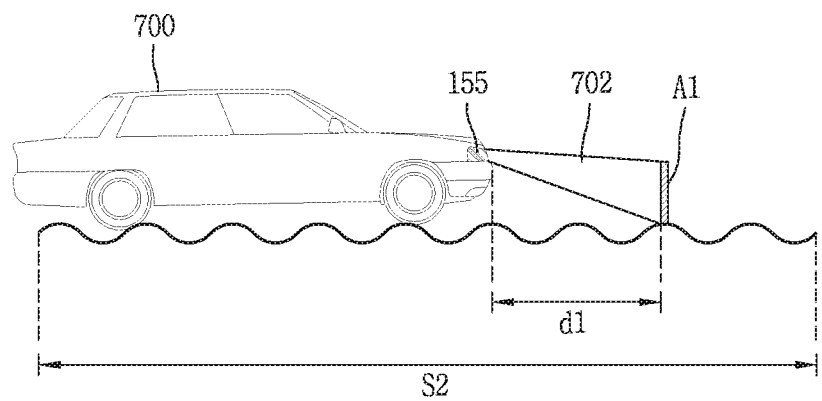

As illustrated in FIG. 8C, when the vehicle enters a topography of a road surface corresponding to the second state S2, in which the front side of the vehicle is lifted up and laid down continuously, the processor 170 may change the light output direction of the head lamp 155 continuously into downward and upward directions, such that the light 702 may be kept output to the reference area A1 spaced apart from the part of the vehicle 700 by the predetermined distance d1.

Figure 9:
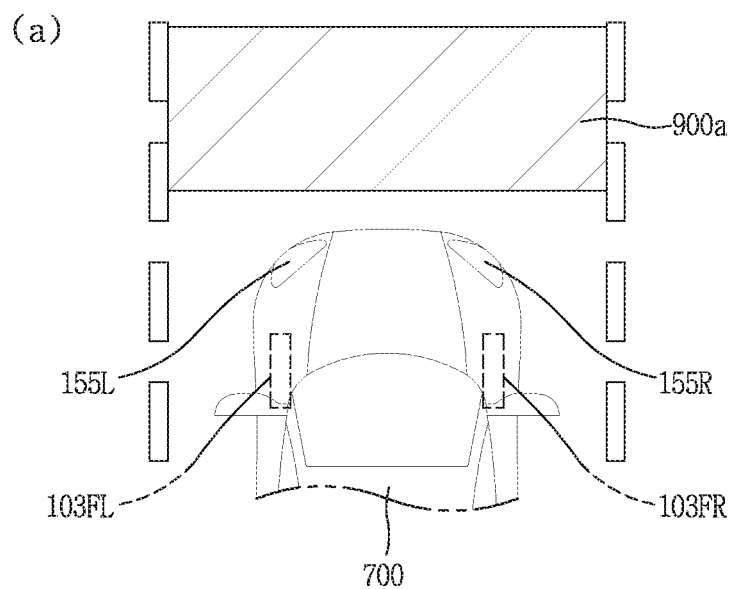
Figure 9:
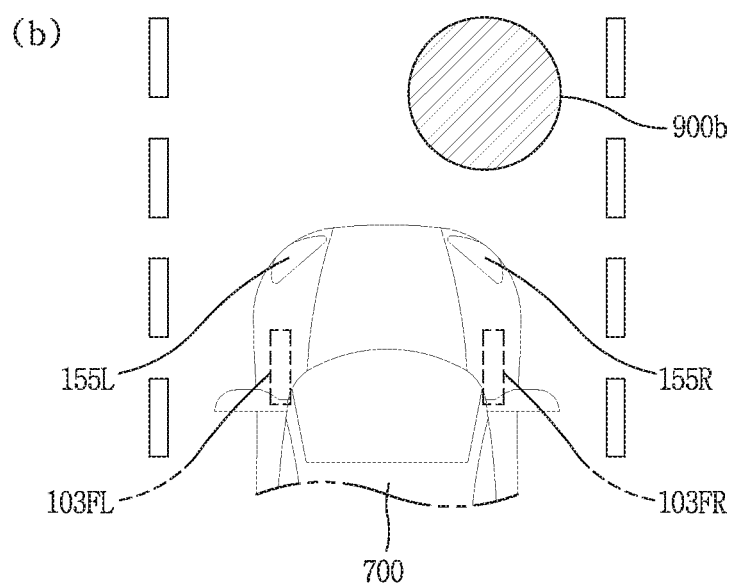

Referring to the examples of FIG. 9, the head lamp 155 according to some implementations may include a left lamp 155L and a right lamp 155R.

The processor 170 may control the left lamp 155L and the right lamp 155R in a simultaneous or individual manner.

The processor 170 may control the left lamp 155L and the right lamp 155R in different manners on the basis of a topography of a road surface corresponding to the second state.

In detail, the processor 170 may control the left lamp and the right lamp when a left side and a right side of the vehicle body are moved by a predetermined height or more due to the topography of the road surface corresponding to the second state.

Also, the processor 170 may control a lamp corresponding to one of the left lamp and the right lamp when one of the left side and the right side of the vehicle body is moved by the predetermined height or more due to the topography of the road surface corresponding to the second state.

For example, as illustrated in the upper diagram of FIG. 9, a topography 900a of a road surface corresponding to the second state may be a topography (e.g., a speed bump or other raised portion) in which both the left and right sides of the vehicle body are raised by the predetermined height or more. When a part (e.g., front wheels 103FL and 103FR) of the vehicle 700 enters the topography 900a of the road surface, both the left and right sides of the vehicle body are lifted up by the predetermined height or more. As such, the front side of the vehicle is tilted upwardly.

In this scenario, the processor 170 may control both of the left lamp 155L and the right lamp 155R to emit light to maintain illumination of a reference area ahead of the vehicle (e.g., reference area A1 in FIG. 7A, 7B, or 8B). In detail, the processor 170 may change the light output direction of each of the left lamp 155L and the right lamp 155R such that the light may consistently be output to the reference area A1. For example, in this instance, the light output directions of the left lamp 155L and the right lamp 155R may all be changed into the downward direction to maintain illumination on the reference area A1.

As another example, referring to the lower diagram of FIG. 9, a topography 900b of a road surface corresponding to the second state may be a topography (e.g., a bump in the road or object in the road) in which one of the left and right sides of the vehicle body is lifted up by a predetermined height or more. As illustrated in the lower diagram of FIG. 9, when a part (e.g., left front wheel 103FL or right front wheel 103FR) of the vehicle enters the topography 900b of the road surface, only one (e.g., right side) of the left or right sides of the vehicle body is lifted up by the predetermined height or more. Alternatively, the topography 900b may be a depression in the road (e.g., a pot hole), in which case one side (e.g., the right side) of the left or right sides of the vehicle body is lowered by the predetermined height or more.

As such, when a part of a lane of a road has a raised or lowered portion, the vehicle may be raised or lowered by a predetermined height or more at only one of the left side or the right side.

In this case, the processor 170 may determine which of the left side or the right side of the vehicle body is raised or lowered by the predetermined height or more, based on the topography 900b of the road surface corresponding to the second state, sensed through the sensing unit 160.

When a part (e.g., left front wheel 103FL or right front wheel 103FR) of the vehicle enters the topography 900b of the road surface corresponding to the second state, the processor 170 may control only one lamp (e.g., right lamp 155R) of the left lamp 155L or the right lamp 155R to maintain illumination on the reference area ahead of the vehicle.

The foregoing examples have illustrated the case where only the front wheels of the vehicle enter the topography 900a, 900b of the road surface corresponding to the second state. However, implementations may also be applied to a case where the rear wheels of the vehicle enter the topography 900a, 900b of the road surface corresponding to the second state.

As such, where a topography of a road surface corresponding to the second state has a structure protruding upwardly, the processor may change the light output direction of at least one of the left lamp or the right lamp into a downward direction when the front wheels of the vehicle first enter the topography, and may change the light output direction of at least one of the left lamp and the right lamp into an upward direction when the rear wheels of the vehicle first enter the topography.

With the configuration, some implementations may control each of a right lamp and a left lamp even in such various topographies (i.e., shapes) of a road surface corresponding to a second state. Accordingly, some implementations may provide a head lamp that may continuously output light to a reference area in an improved manner, and a control device for controlling the same.

In some implementations, the light output direction may be changed based on a driving state of a vehicle. Hereinafter, examples will be given of changing a light output direction on the basis of a driving state of a vehicle, with reference to the accompanying drawings.

Figure 10:
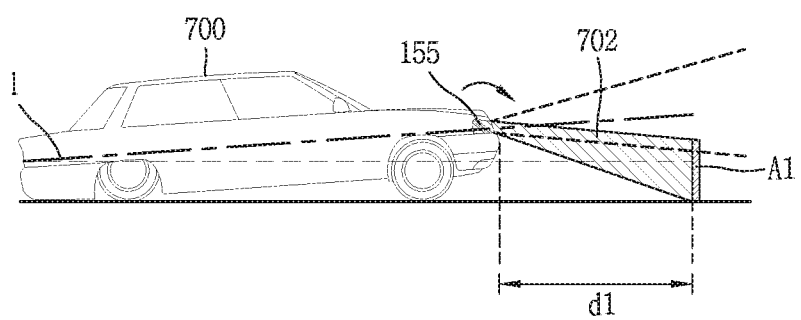
FIGS. 10 and 11 are diagrams illustrating examples of controlling a head lamp according to a change in a driving state of a vehicle.
Figure 10:
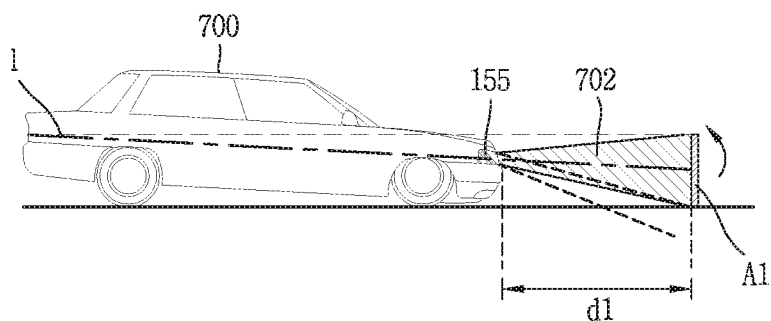
Figure 11:
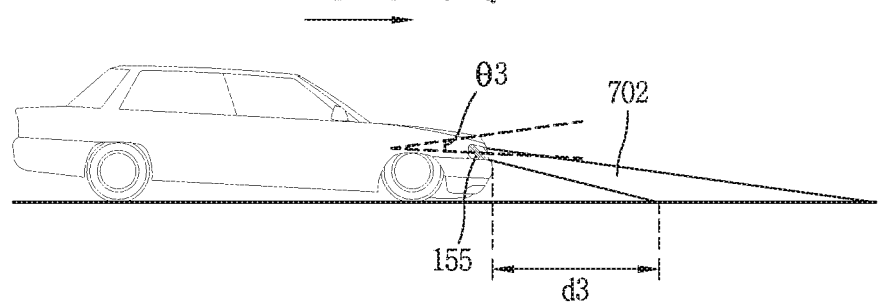
Figure 11:
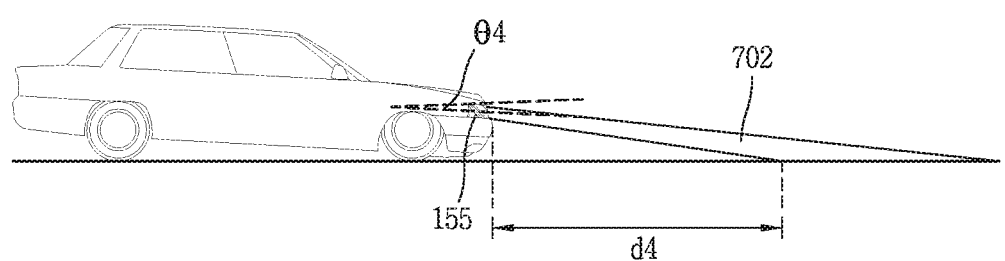

FIGS. 10 and 11 illustrate examples of controlling head lamps according to a change in a driving state of a vehicle.

The processor 170 may detect a driving state of the vehicle 700 through the sensing unit 160.

Here, the driving state of the vehicle may include a stopped state, a driving state at a uniform speed, acceleration driving, deceleration driving, driving on a curved road and the like.

The processor 170 may control the head lamp 155 emitting light in a preset manner on the basis of the change in the driving state of the vehicle.

Here, the change in the driving state of the vehicle may include various scenarios of driving the vehicle in which the vehicle body is tilted.

For example, the change in the driving state of the vehicle may include acceleration driving or deceleration driving that causes the vehicle body to be tilted.

The control in the preset manner may refer to controlling the light 702 emitted from the head lamp 155 to be continuously output to the reference area A1 spaced apart from the one point of the vehicle 700 by the predetermined distance d1.

In detail, the processor 170 may control the head lamp 155 to maintain outputting light to the reference area A1 even though the body of the vehicle 700 having the head lamp 155 is tilted due to the change in the driving state of the vehicle 700.

For example, the change in the driving state of the vehicle, as illustrated in the upper diagram of FIG. 10, may include a case where an acceleration of the vehicle is more than a reference value.

For example, when it is detected that the vehicle currently driven at a uniform speed is accelerated up to a reference speed or more, the processor 170 may determine it as the change in the driving state of the vehicle. This instance may be referred to as fast acceleration driving.

The reference value may be defined as an acceleration value accelerating the vehicle as fast as the body of the vehicle being tilted.

When the acceleration of the vehicle is more than the reference value, the vehicle body may be tilted such that the front side of the vehicle is lifted up.

In this instance, the processor 170 may change the light output direction of the head lamp into a downward direction, such that the light 702 emitted from the head lamp 155 may be output to the reference area A1, even though the vehicle body is tilted.

As another example, the change in the driving state of the vehicle, as illustrated in the lower diagram of FIG. 10, may include a case where a braking force of the vehicle is more than a predetermined value.

For example, when the braking force of the vehicle is more than the predetermined value in response to the user operating a braking apparatus of the vehicle, the vehicle body may be tilted such that the front side of the vehicle is set down. This case may be referred to as rapid braking driving.

The predetermined value may be defined as a braking force of braking the vehicle such that the vehicle body is tilted.

When the braking force of the vehicle is more than the predetermined value, the vehicle body may be tilted such that the front side of the vehicle is set down.

In this instance, the processor 170 may change the light output direction of the head lamp 155 into an upward direction, such that the light 702 emitted from the head lamp 155 may be output to the reference area A1, even though the vehicle body is tilted.

That is, some implementations may provide the head lamp that may continuously output the light 702 to the reference area A1, which is spaced apart from the part (e.g., front wheels) of the vehicle by the predetermined distance d1, even though the vehicle body is tilted according to the driving state in addition to the topographical state of the road surface, and a control device for controlling the same.

Meanwhile, the light output direction of the head lamp may be decided based on a braking distance of the vehicle which is currently driven.

Referring to FIG. 11, the processor 170 may calculate a braking distance on the basis of the driving state of the vehicle 700 and a state of a road surface on which the vehicle 700 is currently driven. Afterwards, the processor 170 may decide the light output direction of the head lamp 155 based on the calculated braking distance.

The driving state of the vehicle 700 may include a driving speed, a current weight, a braking force, a maximum braking force, a surrounding environment and the like of the vehicle. The driving state of the vehicle 700 may be detected by the sensing unit 160.

The state of the road surface on which the vehicle 700 is currently moving may include frictional force, a material, a tilt based on a horizon and the like. The state of the road surface may also be detected through the sensing unit 160.

The processor 170 may calculate the braking distance (or a time to collision (TTC)) of the vehicle on the basis of the driving state of the vehicle and the state of the road surface.

In general, the braking distance may be proportional to the driving speed and the weight of the vehicle, and inversely proportional to the braking force and the frictional force of the vehicle.

As illustrated in FIG. 11, the at least one processor 170 may change the light output direction such that the light 702 emitted from the head lamp 155 is output in an upward direction when a long braking distance is calculated (in other words, when the speed of the vehicle is fast, or the weight of the vehicle is heavy).

For example, the processor 170 may control the light output direction such that the light is output, starting from a point spaced apart from the vehicle by a first distance d3, when the calculated braking distance is a first distance Q1.

As another example, when the calculated braking distance is a second distance Q2 longer than the first distance Q1, the processor 170 may change the light output direction into an upward direction such that the light is output, starting from a point spaced apart from the vehicle 700 by a second distance d4 farther than the first distance d3.

The change in the light output direction, for example, may be executed at a time point that the braking force of the vehicle is applied.

With the configuration, some implementations may control the light 702 emitted from the head lamp 155 to reach a place farther away from the vehicle when the braking distance of the vehicle is far (or the driving speed of the vehicle is fast), thereby providing an effect of reducing an accident incidence rate.

Some implementations may provide a control method that may help reduce an accident incidence rate.

Figure 12:
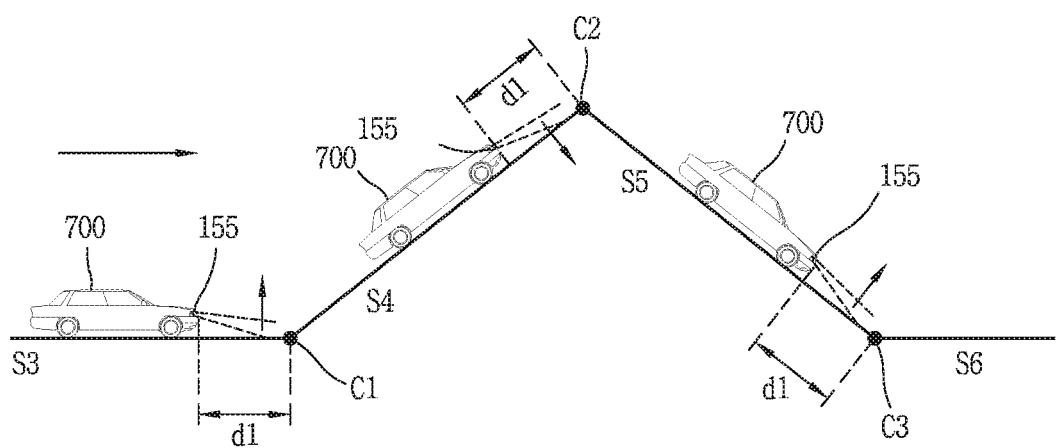
FIG. 12 is a diagram illustrating an example of controlling a head lamp based on a state of a road surface in accordance with another implementation.

FIG. 12 illustrates an example of controlling head lamp based on a state of a road surface in accordance with another implementation.

In some implementations, the processor 170 may detect a zone ahead of the vehicle at which the head lamps of the vehicle are to be changed to a different output state, and may control the head lamps to change to the different output state at a predetermined distance before reaching that zone. The processor 170 may detect such a zone based on a change of an area where the light output from the head lamp reaches the road surface, for example, a change in the area A2 illustrated previously in FIG. 7A. The change in the area A2 may indicate, for example, that the approaching zone is either an uphill portion or a downhill portion of the road ahead of the vehicle.

In such implementations, the processor 170 may detect, through sensing unit 160, a zone ahead of the vehicle in which an area where light is output on the road surface, e.g., area A2 in FIG. 7A, is changed by more than a reference.

Here, the zone in which the light that is output on the road surface is changed by more than the reference may be an uphill topography with a positive tilt or a downhill topography with a negative tilt, based on a tilt of a currently-driving lane.

In the example illustrated in FIG. 12, the zone in which the light that is output to the road surface is changed by more than the reference may be the uphill topography S4 with the positive tilt on the basis of the currently-driving road surface S3.

When the currently-driving road surface is a topography S5 with a negative tilt, the zone in which the light output area on the road surface is changed by more than the reference may be a road surface S6 with a positive tilt, rather than the tilt of the currently-driving road surface S5.

The zone in which the light output area on the road surface is changed by more than the reference may be a downhill topography with a negative tilt, rather than the tilt of the currently-driving flat road surface S5.

Also, when the currently-driving road surface is the road surface S4 with the positive tilt, the zone in which the light output area on the road surface is changed by more than the reference may be the road surface S5 with the negative tilt, rather than the currently-driving road surface S4.

Here, the positive tilt may refer to a tilt that the front side of the vehicle is raised up. Also, the negative tilt may refer to a tilt that the front side of the vehicle is set down.

That is, in an area which is tilted in a positive direction rather than a tilt of a currently-driving road surface, a light output area (i.e., a size (area) of a portion to which light is output) on the road surface may be reduced.

Also, in an area which is tilted in a negative direction rather than a time of a currently-driving road surface, a light output area (i.e., a size of a portion to which light is output) on the road surface may be increased.

The processor 170 may detect areas S3-S4, S4-S5, S5-S6 where the light-output area to the road surface is changed by the reference or more, and change the light output direction of the head lamp 155 before a predetermined distance d1 from start points C1, C2 and C3 of the areas.

The reference may refer to a reference size that the light output area on the road surface is changed as the tilt of the vehicle is increased by a reference or more. The reference may be decided (or changed) by a user setting or by the control of the processor.

For example, when the light output area on the road surface is reduced by the reference or more (e.g., corresponding to an approaching uphill zone), the processor 170 may change the light output direction such that light is output in an upward direction.

As another example, when the light output area on the road surface is increased by the reference or more (e.g., corresponding to an approaching downhill zone), the processor 170 may change the light output direction such that light is output in a downward direction.

Referring to FIG. 12, when the currently-driving road surface is S3, the processor 170 may detect the area (road surface) S4 with the positive tilt rather than the tilt of the road surface S3. In this instance, a size that light output on the road surface S3 is output to the area S4 is reduced smaller than the size that light emitted on the road surface S3 is output on the road surface S3.

When the light output area is reduced by the reference or more, the processor 170 may determine that the topography located in front of the vehicle is an uphill topography (or a topography with a positive tilt rather than the currently-driving road surface).

In this instance, when the vehicle arrives at a position spaced apart from a start point C1 of the area S4 by a predetermined distance d1, the processor 170 may change the light output direction of the light emitted from the head lamp 155 into the upward direction.

Accordingly, some implementations may ensure a user's field of vision by allowing the vehicle to output light farther ahead at an uphill topography (or a topography with a positive tilt rather than a tilt of a currently-driving road surface).

Also, referring to FIG. 12, when the currently-driving road surface is S4, the processor 170 may detect the area (road surface) S5 with the negative tilt rather than the tilt of the road surface S4. In this instance, the size that light emitted on the road surface S4 reaches the road surface S5 is increased more than the size that the light emitted on the road surface S4 is output to the road surface S4.

When the light output area is increased by the reference or more, the processor 170 may determine that the topography where the front side of the vehicle is located is a downhill topography (or a topography with a negative tilt rather than the currently-driving road surface.

In this instance, when the vehicle arrives at a position spaced apart from a start point C2 of the area S5 by the predetermined distance d1, the processor 170 may change the light output direction of the head lamp 155 into a downward direction.

Accordingly, some implementations may ensure a field of vision with respect to an area close to the vehicle, which may be difficult for the driver to see in a downhill topography, in a manner of outputting light more closely in a downhill topography (or a topography with a negative tilt rather than the tilt of the currently-driving road surface.

The predetermined distance d1 may be decided (or changed) by a user setting or by the control of the processor. For example, the predetermined distance d1 may be defined as a distance between the closest point from the vehicle, among points that light emitted from the head lamp 155 is irradiated on the road surface, and one point (e.g., head lamp) of the vehicle.

The processor 170 may decide a degree that the light output direction of the head lamp changes, on the basis of a changed degree of the light output area to the road surface.

For example, when a greater tilt difference is detected between the currently-driving road surface and a zone where the light output area is changed, the processor 170 may change the light output direction more greatly.

That is, the degree of changing the light output direction may be decided in proportion to the tilt difference between the currently-driving road surface and the zone where the light output area is changed.

With the configuration, some implementations may provide head lamp that may help reduce an accident incidence rate, at a predetermined section where a topography of a road surface is changed into an uphill or downhill topography, as well as in a situation that a light output direction is suddenly changed due to a topography of a road surface, and a control device for controlling the same.

In some implementations, as described further below, the head lamp may variously be controlled in association with a driving lane.

Figure 13A:
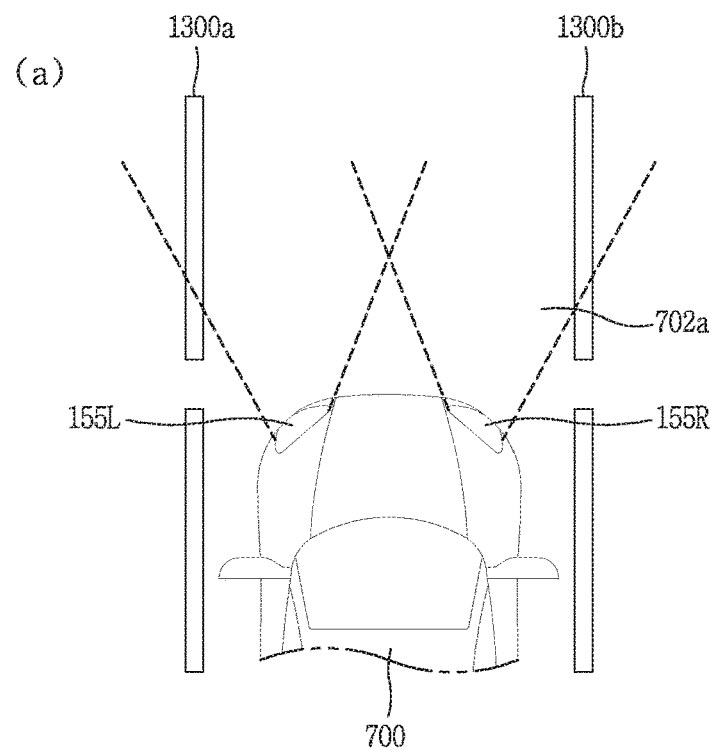
FIGS. 13A and 13B are diagrams illustrating examples of controlling a head lamp in relation to a lane in which the vehicle is travelling.
Figure 13A:
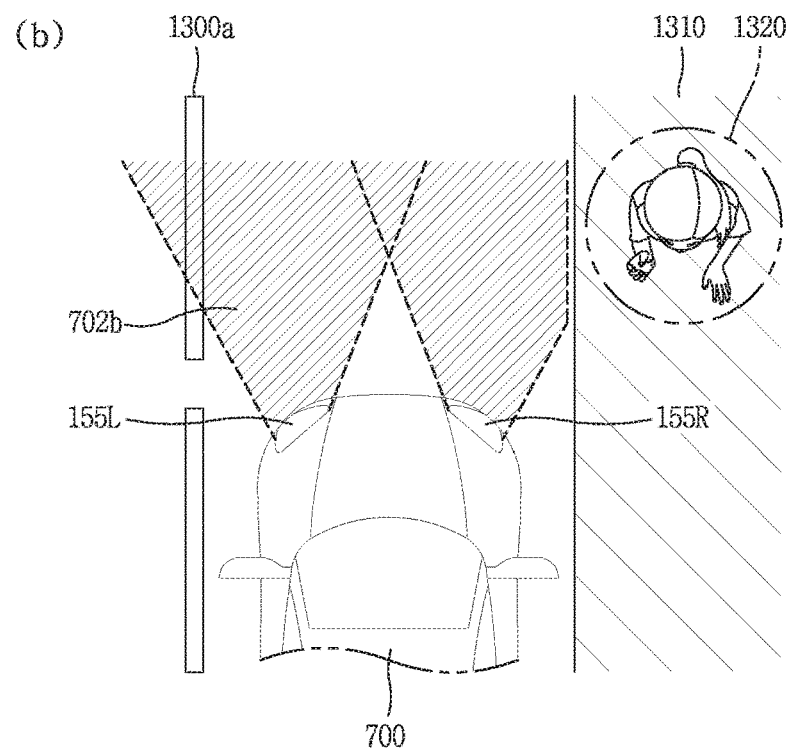
Figure 13B:
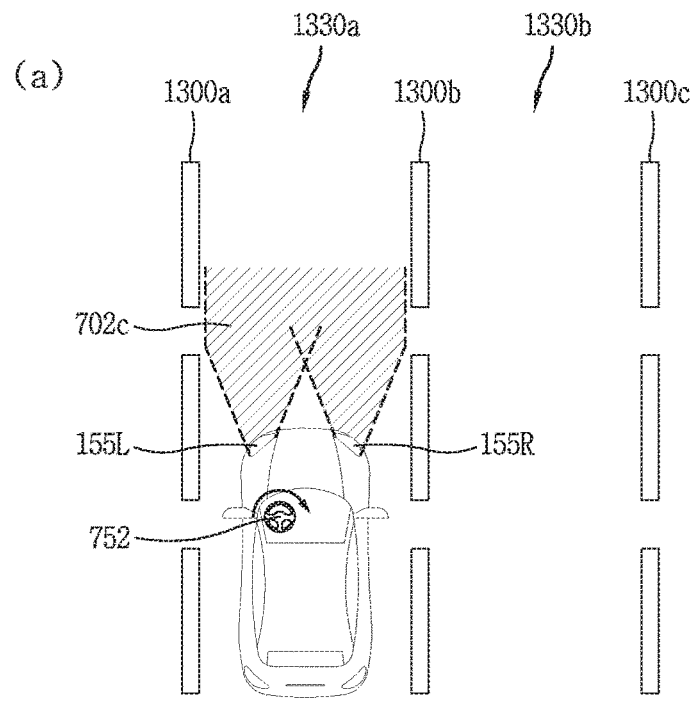
Figure 13B:
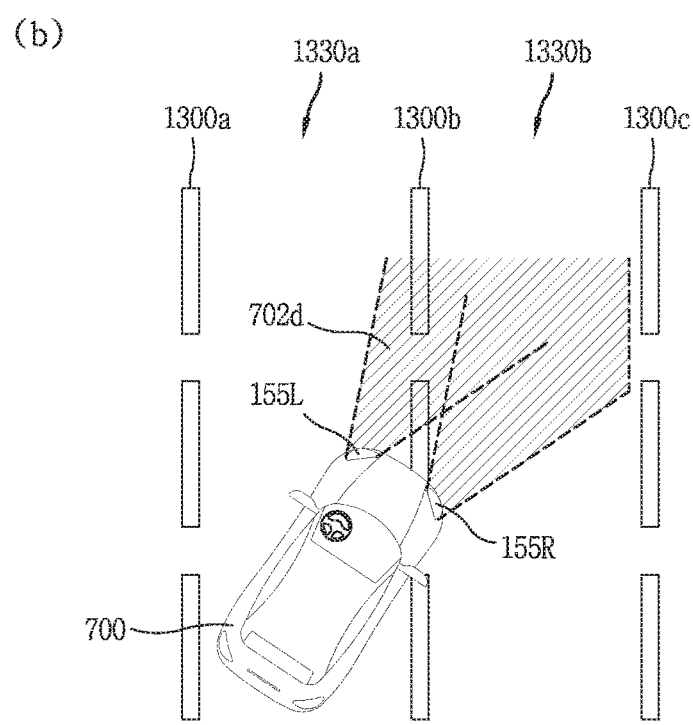

FIGS. 13A and 13B illustrate examples of controlling head lamps in association with a driving lane.

The processor 170 may detect a currently-driving lane of the vehicle 700 through the sensing unit 160. The lane, for example, may be detected by analyzing images received through the camera 200.

The processor 170 may also detect a surrounding region of the currently-driving lane of the vehicle 700 through the sensing unit 160.

The processor 170 may control the head lamp 155 not to output the light 702 to the surrounding region when the surrounding region meets a preset condition.

For example, as illustrated in the upper diagram of FIG. 13A, the light 702 emitted from the head lamp 155 may be output over the currently-driving lane 1330*a* (i.e., between 1300*a* and 1300*b*).

As illustrated in the lower diagram of FIG. 13A, when a surrounding region 1310 of the currently-driving lane 1330*a* meets a preset condition, the processor 170 may control the head lamp 155 not to output the light 702*b* to the surrounding region 1310.

The preset condition may include, for example, a topography higher than the currently-driving lane by a predetermined height, an obstacle with a predetermined height, or the like.

For example, in the lower diagram of FIG. 13A, when the right region 1310 of the driving lane is a topography (e.g., sidewalk) with a predetermined height, the processor 170 may control the head lamp 155 (e.g., right lamp 155R) not to output light to the right region 1310. This may help mitigate cases where the head lamp 155 interferes with other people, e.g., pedestrians or other drivers.

In some implementations, when an obstacle (e.g., median) with a predetermined height is sensed at a left region of the driving lane, the processor 170 may control the head lamp 155 (e.g., left lamp 155L) to either output or not output light to the left region.

The processor 170, as illustrated in the lower diagram of FIG. 13A, may control the head lamp 155 to output (or not to output) light 702*b* to a preset object 1320 when the preset object 1320 is detected at the surrounding region 1310 of the currently-driving lane through the sensing unit 160.

For example, the preset object 1320 may include a person, an animal, a road sign, etc. Also, the preset object 1320 may be decided by a user setting or by control of the processor 170.

As another example, the processor 170 may track a preset object when the preset object (e.g., another vehicle driving in an opposite direction) is detected at a surrounding region (e.g., opposite driving lane) of the currently-driving lane through the sensing unit 160.

Subsequently, the processor 170 may control the head lamp 155 to output (or not to output) light only to the preset object on the basis of the tracking result of the preset object.

Referring to the upper diagram of FIG. 13B, the processor 170 may detect a currently-driving lane 1330*a* of the vehicle 700 through the sensing unit 160. The processor 170 may control the head lamp 155 (155L and 155R) to output light 702*c* only to the currently-driving lane 1330*a* of the vehicle 700. This may help focus the illumination on the currently-driving lane, and not interfere with other lanes on the road.

Also, when a manipulation for the vehicle is determined as a lane change, as illustrated in the lower diagram of FIG. 13B, the processor 170 may control the head lamp 155 (155L and 155R) to output light 702*d* to a lane 1330*b* to change, from one end 1300*b* of the lane 1330*b*, adjacent to the currently-driving lane 1330*a*, to another end 1300*c* opposite to the one end 1300*b* of the lane 1330*b* to change.

The manipulation for the vehicle, for example, may correspond to the user's manipulation for the steering wheel 752.

For example, as illustrated in the lower diagram of FIG. 13B, when the steering wheel 752 is rotated by a predetermined angle or more in a right direction (or when a user's driving manipulation of turning on a right turn indicator light is input), the processor 1700 may determine the manipulation for the vehicle as a lane change.

In such scenarios of a vehicle changing lanes, e.g., from lane 1330*a* to lane 1330*b* in FIG. 13B, the processor 170 may control the head lamps 155L and 155R to output light to an entire range of the lane into which the vehicle is to change, e.g., lane 1330*b*.

For example, in the lower diagram FIG. 13B, the head lamps are controlled to output light onto the full range of the new lane, lane 1330*b*, for example by outputting light up to the opposite end 1300*c* of the lane 1330*b*. In such implementations, the head lamps may be controller to illuminate the full range of the new lane, e.g., lane 1330*b*.

In some implementations, the processor 170 may also determine, based on the manipulation of the vehicle, a speed at which to change the light output direction of the head lamps onto the new lane, e.g., lane 1330*b* in FIG. 13B. For example, the processor 170 may change the light output direction in proportion to a rotating speed of the steering wheel when the manipulation for the vehicle is the rotation of the steering wheel.

As such, when the rotation speed of the steering wheel is fast, the processor 170 may quickly change the light output direction such that light may be output up to the opposite end 1300*c* of the lane 1330*b* into which the vehicle will change lanes, thus fully illuminating the desired lane.

With the configuration, some implementations may provide a control device configured to control the head lamp in an improved manner according to a surrounding environment of a currently-driving lane or according to a driving manipulation for the vehicle.

The aforementioned control device 100 may be included in the vehicle 700. In some implementations, the control device 100 may be a separate device mounted on the vehicle.

The aforementioned operation or control of the control device 100 may also be equally/similarly applied as the operation or control of the vehicle 700. For example, the control of the vehicle (or the control of the control device) may include detecting a topographical state of a currently-driving road surface of the vehicle, outputting light to a reference area in a topography of a road surface corresponding to a first state, and controlling head lamps of the vehicle to maintain an output light to the reference area based on the topography of the road surface changing to a second state different from the first state.

In some implementations, the control operation may be configured to control the head lamps outputting the light in a preset manner based on a change in a driving state of the vehicle.

Some or all of the operations described above may be performed by a controller 770 provided in the vehicle 700, as well as the control device 100.

Also, one or more functions, configurations, or controls performed by the control device 100 may be performed by the controller 770 of the vehicle 700. That is, one or more controls described herein may also be applied to the control of the vehicle and the control of the control device.

Implementations described herein may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like.

Also, the computer-readable medium may also be implemented as a format of carrier wave (e.g., transmission via an Internet). The computer may include the controller 180 of the terminal. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control device, comprising:
    a sensing unit configured to sense a topographical state of a road surface on which a vehicle is travelling; and
    at least one processor configured to:
        based on the topographical state of the road surface being a first topographical state, control a head lamp of the vehicle to be in a first output state that outputs light to a reference area ahead of the vehicle; and
        based on the topographical state of the road surface changing to a second topographical state different from the first topographical state, control the head lamp of the vehicle to change to a second output state that maintains the output of the light to the reference area ahead of the vehicle,
    wherein the at least one processor is further configured to:
        detect, through the sensing unit, a driving state of the vehicle; and
        control the head lamp of the vehicle to maintain the output of the light to the reference area ahead of the vehicle further based on a change in the driving state of the vehicle,
    wherein the change in a driving state of the vehicle corresponds to the vehicle approaching a zone in which an area of the light that is output from the head lamp on the road surface is changed by more than a threshold value, and
    wherein the at least one processor is further configured to control the head lamp of the vehicle to maintain the output of the light to the reference area ahead of the vehicle by:
        changing a light output direction of the head lamp prior to the vehicle reaching a predetermined distance from a start point of the zone, based on a change in the area of the light that is output from the head lamp on the road surface.

2. The control device of claim 1, wherein the at least one processor is configured to:
    detect, through the sensing unit, a location ahead of the vehicle where the topographical state of the road surface changes to the second topographical state; and
    based on the detected location and a driving speed of the vehicle, determine a time at which to control the head lamp to change to the second output state.

3. The control device of claim 1, wherein the at least one processor is configured to control the head lamp of the vehicle to change to the second output state that maintains the output of the light to the reference area ahead of the vehicle by:
    controlling a light output direction of the head lamp to a direction that maintains the output of the light on the reference area ahead of the vehicle based on the topographical state of the road surface changing to the second topographical state.

4. The control device of claim 1, wherein the head lamp comprises a left lamp and a right lamp, and
    wherein the at least one processor is configured to control the head lamp of the vehicle to change to the second output state that maintains the output of the light to the reference area ahead of the vehicle by:
    controlling the left lamp and the right lamp differently based on the topographical state of the road surface changing to the second topographical state.

5. The control device of claim 4, wherein controlling the left lamp and the right lamp differently based on the topographical state of the road surface changing to the second topographical state comprises:
    controlling both the left lamp and the right lamp to change output states based on both a left body of the vehicle and a right body of the vehicle being raised by at least a threshold height corresponding to the topographical state of the road surface changing to the second topographical state, and
    controlling one of the left lamp or the right lamp to change an output state based on one of the left body or the right body of the vehicle being raised by at least the threshold height corresponding to the topographical state of the road surface changing to the second topographical state.

6. The control device of claim 1, wherein the change in the driving state of the vehicle corresponds to a body of the vehicle being tilted.

7. The control device of claim 6, wherein the change in the driving state of the vehicle corresponds to at least one of an acceleration of the vehicle exceeding a threshold acceleration or a braking force of the vehicle exceeding a threshold braking force.

8. The control device of claim 1, wherein the at least one processor is configured to:
    calculate a braking distance based on the driving state of the vehicle and based on the topographical state of the road surface; and
    determine a light output direction of the head lamp based on the calculated braking distance.

9. The control device of claim 8, wherein the change in the driving state of the vehicle corresponds to the calculated braking distance exceeding a threshold braking distance, and
    wherein the at least one processor is configured to control the head lamp of the vehicle to maintain the output of the light to the reference area ahead of the vehicle by:
    changing a light output direction of the head lamp in an upward direction based on the calculated braking distance exceeding a threshold braking distance.

10. The control device of claim 1, wherein changing the light output direction of the head lamp prior to the vehicle reaching the predetermined distance from the start point of the zone, based on a change in the area of the light that is output from the head lamp on the road surface, comprises:
    changing the light output direction in an upward direction based on the area of the light that is output from the head lamp on the road surface being reduced by more than a first threshold value; and
    changing the light output direction in a downward direction based on the area of the light that is output from the head lamp on the road surface being increased by more than a second threshold value.

11. The control device of claim 1, wherein changing a light output direction of the head lamp prior to the vehicle reaching a predetermined distance from a start point of the zone, based on a change in the area of the light that is output from the head lamp on the road surface, comprises:

based on a degree of change of the area of the light that is output from the head lamp on the road surface, determining a degree of change of the light output direction of the head lamp.

12. The control device of claim 1, wherein the at least one processor is further configured to:
   detect, through the sensing unit, a surrounding area that is outside of a lane in which the vehicle is travelling; and
   based on the surrounding area satisfying a first condition, control the head lamp to prevent the output of the light from reaching the surrounding area.

13. The control device of claim 12, wherein the at least one processor is configured to:
   based on an object being detected in the surrounding area through the sensing unit, control the head lamp to direct at least part of the light that is output from the head lamp to the detected object in the surrounding area.

14. The control device of claim 1, wherein the at least one processor is configured to:
   control the head lamp to confine the light that is output from the head lamp to a first lane in which the vehicle is travelling; and
   based on detecting that the vehicle is changing from the first lane to a second lane adjacent to the first lane, control the head lamp to output the light to extend to a far boundary of the second lane.

15. The control device of claim 14, wherein the at least one processor is configured to control the head lamp to output the light to extend to the far boundary of the second lane by:
   based on detecting that the vehicle is changing from the first lane to the second lane adjacent, determining a speed at which to change a light output direction of the head lamp from the first lane towards the second lane; and
   changing the light output direction of the head lamp from the first lane to the second lane at the determined speed.

16. A vehicle comprising:
   a sensing unit configured to sense a topographical state of a road surface on which the vehicle is travelling; and
   at least one processor configured to:
   based on the topographical state of the road surface being a first topographical state, control a head lamp of the vehicle to be in a first output state that outputs light to a reference area ahead of the vehicle; and
   based on the topographical state of the road surface changing to a second topographical state different from the first topographical state, control the head lamp of the vehicle to change to a second output state that maintains the output of the light to the reference area ahead of the vehicle,
   wherein the at least one processor is further configured to:
   detect, through the sensing unit, a driving state of the vehicle; and
   control the head lamp of the vehicle to maintain the output of the light to the reference area ahead of the vehicle further based on a change in the driving state of the vehicle,
   wherein the change in a driving state of the vehicle corresponds to the vehicle approaching a zone in which an area of the light that is output from the head lamp on the road surface is changed by more than a threshold value, and
   wherein the at least one processor is further configured to control the head lamp of the vehicle to maintain the output of the light to the reference area ahead of the vehicle by:
   changing a light output direction of the head lamp prior to the vehicle reaching a predetermined distance from a start point of the zone, based on a change in the area of the light that is output from the head lamp on the road surface.

17. A method for controlling a vehicle, the method comprising:
   detecting a topographical state of a road surface on which a vehicle is travelling;
   based on the topographical state of the road surface being a first topographical state, controlling a head lamp of the vehicle to be in a first output state that emits light to a reference area ahead of the vehicle; and
   based on the topographical state of the road surface changing to a second topographical state different from the first topographical state, controlling the head lamp of the vehicle to change to a second output state that maintains the output of the light to the reference area ahead of the vehicle,
   wherein the method further comprises:
   detecting a surrounding area that is outside of a lane in which the vehicle is travelling,
   based on the surrounding area satisfying a first condition, controlling the head lamp to prevent the output of the light from reaching the surrounding area; and
   based on an object being detected in the surrounding area, controlling the head lamp to direct at least part of the light that is output from the head lamp to the detected object in the surrounding area.

18. The method of claim 17, wherein controlling the head lamp of the vehicle is performed further based on a change in a driving state of the vehicle.

* * * * *